(12) United States Patent
Vankamamidi et al.

(10) Patent No.: US 12,379,868 B1
(45) Date of Patent: Aug. 5, 2025

(54) DATA STORAGE MANAGEMENT TECHNIQUES

(71) Applicant: Dell Products L.P., Hopkinton, MA (US)

(72) Inventors: Vamsi K. Vankamamidi, Hopkinton, MA (US); Ajay Karri, South Grafton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/626,835

(22) Filed: Apr. 4, 2024

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
USPC ........................................................ 711/154
See application file for complete search history.

(56) References Cited

U.S. PATENT DOCUMENTS

| | | | |
|---|---|---|---|
| 2009/0198931 A1* | 8/2009 | Ohyama | G06F 3/0689 711/E12.001 |
| 2023/0214115 A1* | 7/2023 | Lee | G06F 3/0679 711/102 |

FOREIGN PATENT DOCUMENTS

| | | | | |
|---|---|---|---|---|
| CN | 107168884 A | * | 9/2017 | ......... G06F 12/0246 |

* cited by examiner

*Primary Examiner* — Mardochee Chery
(74) *Attorney, Agent, or Firm* — BainwoodHuang

(57) ABSTRACT

In at least one embodiment, processing can include: recording write operations as entries in a log; flushing the entries from the log, said flushing including persistently storing, on non-volatile storage, content written by the write operations; responsive to determining a system has a current workload below a specified workload threshold, performing first processing including: determining a first minimum number of free blocks of the non-volatile storage based on: i) an average number of free blocks expected to be consumed in connection with flushing the log in each time interval, ii) a constant, and iii) a second minimum number of blocks denoting an upper bound of a number of blocks of the non-volatile storage consumed by flushing the log in each time interval; and responsive to determining that a current number of free blocks is less than the first minimum number, performing garbage collection processing on the non-volatile storage.

19 Claims, 15 Drawing Sheets

| F values | U values | (NS) # Source PLBs needed to generate 1 free PLB | (NT) # target PLBs written to |
|---|---|---|---|
| 50% (e.g., .50 or 1/2) | 50% (e.g., .50 or 1/2) | 2 | 1 |
| 33% (e.g., .33 or 1/3) | 67% (e.g., .67 or 2/3) | 3 | 2 |
| 25% (e.g., .25 or 1/4) | 75% (e.g., .75 or 3/4) | 4 | 3 |
| 10% (e.g., .10 or 1/10) | 90% (e.g., .90 or 9/10) | 10 | 9 |

FIG. 7

DATA STORAGE MANAGEMENT TECHNIQUES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a storage system from one or more hosts, a plurality of write operations that write first content to a plurality of target logical addresses; recording, at the storage system, the plurality of write operations as a plurality of entries in a log; flushing, from the log, the plurality of entries denoting the plurality of write operations, wherein said flushing includes persistently storing, on non-volatile storage, the first content written by the plurality of write operations, wherein the non-volatile storage includes a plurality of storage devices; determining that the storage system has a current workload below a specified workload threshold; responsive to determining that the storage system has the current workload below the specified workload threshold, performing first processing including: determining a first minimum number of free blocks of the non-volatile storage based on: i) a first quantity denoting an average number of free blocks expected to be consumed, within a time duration of a single time interval, in connection with flushing the log, ii) a first constant, and iii) a second minimum number of blocks denoting an upper bound of a number of blocks of the non-volatile storage consumed by flushing the log in a single time interval; and responsive to determining that a current number of free blocks of the non-volatile storage, that is available for storing content written by write operations having corresponding entries flushed from the log, is less than the first minimum number, performing garbage collection processing to increase the current number of free blocks of the non-volatile storage available for storing content written by write operations having corresponding entries flushed from the log.

In at least one embodiment, the first constant can be a value that is multiplied by the first quantity to account for variations in free blocks consumed in connection with flushing the log. A first product can be determined by multiplying the first constant by the first quantity, and wherein the first minimum number can be determined by adding the first product and the second minimum number of blocks. The second minimum number of blocks can be based, at least in part, on a maximum number of blocks consumed by a maximum number of parallel flushes of the log supported by the storage system within each single time interval. The maximum number of parallel flushes of the log supported by the storage system can be based, at least in part, on a number of processor cores of the storage system available for flushing entries from the log. The average number of free blocks expected to be consumed, within a time duration of a single time interval, in connection with flushing the log, can be based, at least in part, on an average flush rate denoting an average number of entries flushed from the log in each single time interval.

In at least one embodiment, the plurality of storage devices of the non-volatile storage can include non-volatile solid state drives (SSDs), and wherein the non-volatile SSDs can include one or more types of flash drives. The plurality of writes can include: i) a first write that writes first data to a first logical address; and ii) a second write that overwrites the first data of the first logical address by writing second data to the first logical address. Processing can include: flushing, from the log at a first point in time, a first entry representing the first write, wherein said flushing the first entry includes storing the first data at a first storage location on the non-volatile storage; and flushing, from the log at a second point in time after the first point in time, a second entry representing the second write, wherein said flushing the second entry includes storing the second data at a second storage location on the non-volatile storage, wherein the second storage location is different from the first storage location, and wherein responsive to said storing the second data, the first storage location is marked as storing invalid content and available for reclamation and reuse.

In at least one embodiment, performing garbage collection processing can include: determining, in accordance with a median block utilization, a first candidate set of partially filled blocks of the non-volatile storage; selecting, from the first candidate set, a first plurality of partially filled blocks to use as first source blocks; selecting, from the non-volatile storage, one or more target blocks of free storage; and copying first valid content from the first source blocks to the one or more target blocks, wherein as a result of said copying, at least one net free block of non-volatile storage is generated with respect to the first source blocks and the one or more target blocks. Each partially filled block of the first candidate set can have a corresponding block utilization that is equal to or less than the median block utilization, wherein the corresponding block utilization can denote a portion of said each partially filled block that stores valid content, wherein the corresponding block utilization can indicate that said each partially filled block is partially filled with valid content intermixed with unused storage areas. The median block utilization can be determined with respect to a population of partially filled blocks of the non-volatile storage, wherein each partially filled block of the population: i) can be available for storing content associated with entries flushed from the log, and ii) can have an associated block utilization indicating that said each partially filled block is partially filled with valid content intermixed with unused storage areas.

In at least one embodiment, processing can include: ordering the first candidate set of partially filled blocks of the non-volatile storage based on increasing corresponding block utilizations of the partially filled blocks of the first set; and wherein said selecting, from the first set, the first plurality of partially filled blocks to use as first source blocks, includes selecting two or more partially filled blocks of the first set, wherein each of the two or more partially filled blocks selected has a corresponding block utilization that is lower than any other partially filled block of the first set that is not included in the two or more partially filled blocks selected. The one or more target blocks can include a single target block, and wherein said copying the first valid content from the first source blocks can include copying valid content from each of the two or more partially filled blocks to the single target block, wherein the combined utilization of the two or more partially filled blocks does not exceed 100% denoting complete utilization of the single target block.

In at least one embodiment, the first processing can include determining, in accordance with a plurality of conditions, whether to perform partial block defragmentation that generates a single net free block of the non-volatile storage as a result of performing multiple cycles or iterations of data movement of valid content from multiple source blocks of non-volatile storage to one or more free target blocks of non-volatile storage. The partial block defragmentation can be performed responsive to each of the plurality of conditions evaluating to true. The plurality of conditions can include: a first condition specifying that the current workload of the storage system be less than the specified workload threshold; and a second condition specifying that the garbage collection processing is unable to generate at least one net free block of the non-volatile storage in a single cycle or iteration of data movement of valid content from multiple source blocks of the non-volatile storage to one or more free target blocks of the non-volatile storage. The plurality of conditions can include: a third condition specifying that the current number of free blocks of the non-volatile storage, that is available for storing content written by write operations having corresponding entries flushed from the log, is less than the first minimum number; and a fourth condition specifying that the current number of free blocks of the non-volatile storage, that is available for storing content written by write operations having corresponding entries flushed from the log, is equal to or less than the second minimum number of blocks denoting an upper bound of a number of blocks of the non-volatile storage consumed by flushing the log in a single time interval.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 7 is a table of values that can be used to determine write amplification in an embodiment in accordance with the techniques of the present disclosure.

DETAILED DESCRIPTION OF EMBODIMENT(S)

Figure 1:
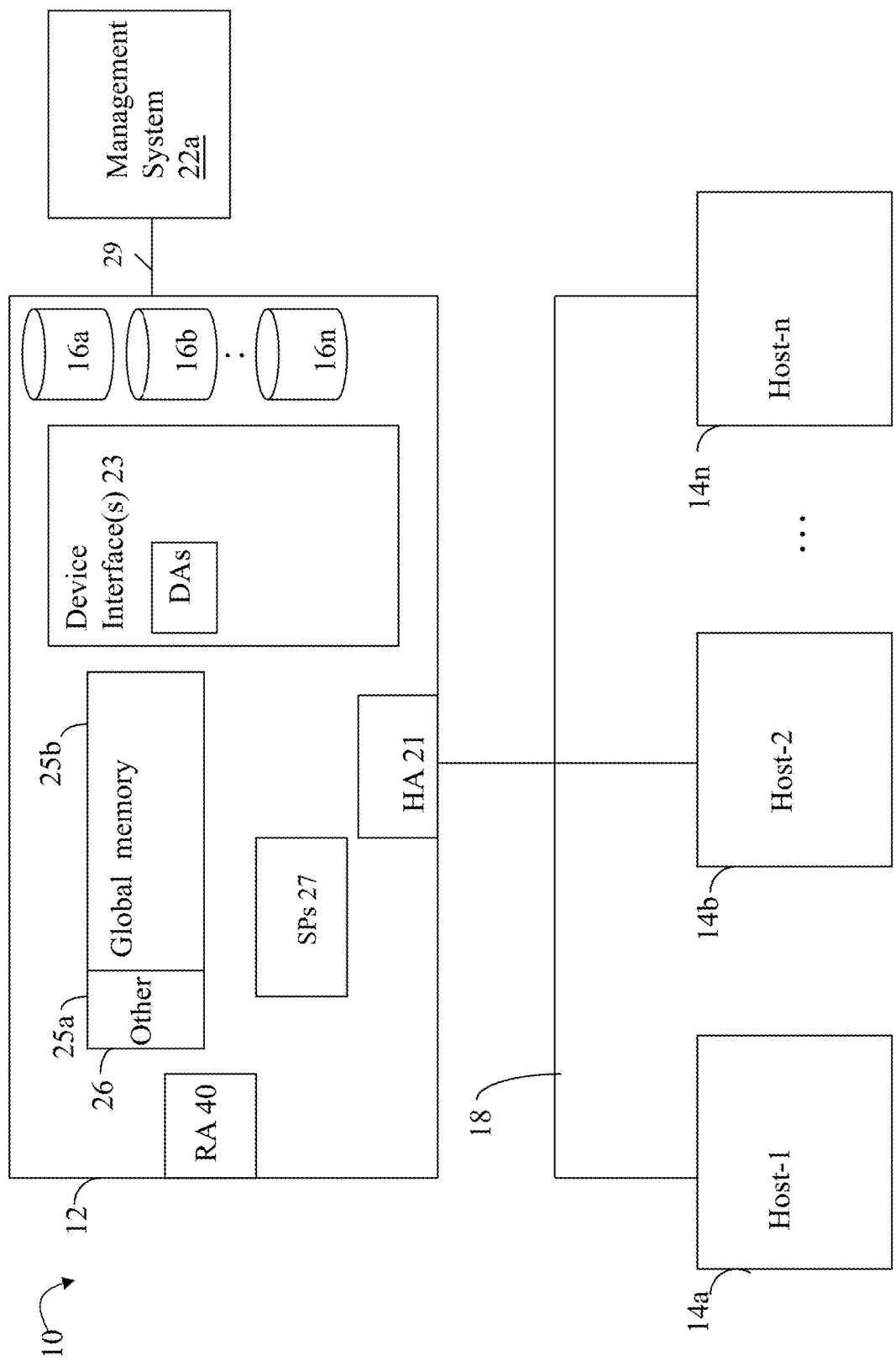
FIG. 1 is an example of components included in a system in accordance with the techniques of the present disclosure.

Generally, log structured stores or systems (LSSs) can be characterized by allowing new writes to be directed to free or unused storage on a data storage device, and by performing garbage collection (GC) that allows holes of storage including unused or invalid data to be compacted and reused. In an LSS, as newly written data provides updated values for existing data stored at a logical address, the newly written data can be stored at a new physical address or location on back-end (BE) non-volatile storage rather than overwriting or performing an "in place" update of a first storage location on BE non-volatile storage, where the first storage location contains the existing data of the logical address. After writing the new data to the logical address, where the new data is stored at the new physical address or location, the existing data stored at the first storage location can be old, stale or invalid. The LSS can perform GC processing to reclaim the first storage location containing the stale, invalid data. As a result of performing GC processing, the first storage location can reclaimed, freed and made available for reuse.

Modern data storage systems can implement an LSS. The LSS as implemented by a data storage system can have its own components, for example, to maintain a log, perform logical to physical address translation using its own metadata, to perform GC processing, to perform storage management controlling data placement, to perform metadata management, and the like. Additionally, such modern data storage system can also utilize non-volatile BE storage which includes one or more non-volatile solid state storage devices or SSDs. In an LSS, newly written content to a logical address can be written to a new physical storage location on the BE SSDs. As noted above, the new content replaces the existing content of the logical address, where the existing content can be stored at another BE SSD storage location that is different from the new physical storage location of the newly written content of the logical address.

The LSS of the data storage system encounters write amplification (WA) which can generally be characterized as additional writes performed in order to write or store a single unit of valid data. The WA can occur generally due to the nature of operation of the LSS, such as noted above, due to 1) the LSS storing newly written content to a logical address at a new physical address or location each time there is an update or write to the logical address; and then 2) the GC processing performed to reclaim storage of stale invalid content, where the reclaimed storage can be made free and available for reuse. The GC processing performed by the storage system can include data movement or copying of valid content between BE storage chunks or portions in efforts to create or generate free BE storage chunks or portions for re-use. Although data stored at logical addresses can be written at a first point in time to sequentially contiguously located BE storage locations, as existing data of logical addresses is replaced with newly written content, existing data can become stale and invalid and can create holes of invalid data portions interspersed among valid data portions. As a result, GC processing can be performed to consolidate such valid data portions from multiple storage chunks also including invalid data portions to result in obtaining one or more free storage chunks. For example, GC processing can use two source chunks partially populated with valid content and a single target chunk that is completely free (e.g., storage of entire chunk is free and unused). GC processing can combine the valid content from the two source chunks and store the collective valid content of the two source chunks in the single target chunk, thereby generating one net free chunk. WA can include the additional writes performed by such GC processing to move or copy the valid content from the two source chunks to the single target chunk, where the additional writes can be performed in addition to previously writing the valid content to the source chunks such as a result of flushing a log of recorded write operations. The additional writes of WA can be characterized as an additional cost incurred in connection with storage management and policies of the LSS.

In this manner, the WA including the additional writes incurred as a result of GC can contribute to usage and wear of the BE storage devices or drives such as non-volatile SSDs. The non-volatile SSDs may only support a limited number of writes per day (WPD) in efforts to limit the wear on the SSDs in order for the SSDs to have at least a specified expected usable lifetime. Exceeding the WPD limit of an SSD can result in reducing the expected usable lifetime of the SSD. As a result to maintain or extend the expected usable lifetime of an SSD, there is motivation to generally reduce or limit the number of writes made to the SSD, where such writes can include writes incurred as a result of WA, such as by GC processing.

In at least one embodiment, the non-volatile SSDs providing BE non-volatile storage can include drives of one or more types or technologies. For example, the non-volatile SSDs can include any of multi-level cell (MLC) SSDs, triple-level cell (TLC) SSDs, single-level cell (SLC) SSDs, and/or quad-level cell (QLC) SSDs. An SLC SSD can store one bit of information per flash memory cell. An MLC SSD can store two bits of information per flash memory cell. A TLC SSD can store three bits of information per flash memory cell. A QLC SSD can store four bits of information per flash memory cell. In at least one embodiment, BE non-volatile storage can include QLC SSDs or drives alone or in combination with any of SLC, TLC and/or MLC SSDs or drives. The QLC drives can be a lower cost drive option than SLC, TLC and MLC drives. Use of QLC drives can be a desirable option for BE non-volatile storage in comparison, for example, to TLC drives since the QLC drives can provide read throughput similar to the move expensive TLC drives. However, the less expensive QLC drives generally have a lower endurance than SLC, TLC and MLC drives because a QLC drive stores more bits of data in each cell than the SLC, TLC and MLC drives. Thus, the QLC drives generally support a lower number of WPD than the SLC, TLC and MLC drives.

Generally, it can be desirable to limit writes to non-volatile SSDs of any suitable technology in efforts to reduce the drive wear. It can be desirable to reduce or limit writes to the non-volatile SSDs such as by limiting or reducing drive WA incurred as a result of GC processing. Additionally in a system using QLC drives, generally limiting writes to the QLC drives, such as by limiting or reducing WA, can be even more important or critical than limiting writes to TLC, SLC or MLC drives since the QLC drives generally have lower WPD limits that TLC, SLC and MLC drives.

Accordingly, the techniques of the present disclosure can be used to generally reduce the writes to storage devices. In at least one embodiment, the techniques of the present disclosure can be used to reduce WA of non-volatile storage devices such as non-volatile SSDs, where the WA can be reduced by selectively limiting when GC processing is performed. In at least one embodiment, the non-volatile SSDs can be included in BE non-volatile storage of a storage system or appliance. In at least one embodiment, the non-volatile SSDs can include drives of one or more suitable technologies or types. In at least one embodiment, the non-volatile SSD types or technologies can include any of SLC, MLC, TLC and QLC drives. The techniques of the present disclosure are not limited to any particular type or technology of storage device that may be provided herein for purposes of illustration.

The techniques of the present disclosure describe policies that can be used in at least one embodiment for throttling or selectively limiting when GC processing is performed; and/or policies that can be used in connection with selecting PLBs used in connection with GC processing to reduce WA and thus reduce SSD drive wear.

Generally, the techniques of the present disclosure can be used in connection with any suitable storage device with a goal of reducing WA. In at least one embodiment using non-volatile SSDs having a limited number of WPD, it can be desirable to limit or reduce WA in order limit drive wear and avoid exceeding a target WPD limit in order to achieve an expected usable lifetime for the non-volatile SSDs.

In at least one embodiment, the techniques of the present disclosure can be used to implement and optimize GC policies that result in limiting, reducing and/or minimizing WA incurred as a result of GC processing to thereby limit, reduce and/or minimize corresponding wear on non-volatile SSDs used by an LSS of a storage system. In at least one embodiment, the non-volatile SSDs of the LSS can be included in BE non-volatile storage, where the non-volatile SSDs can include QLC drives. In at least one such embodiment, reducing WA of the QLC drives can be more critical, for example, relative to other non-SSD drive technologies or types, such as SLC, and TLC drives, due to the relatively lower WPD target or limit of QLC drives. However, the techniques of the present disclosure are generally applicable for use in embodiments with other drives types and technologies, including other SSD types, such as MLC, TLC and/or SLC drives, which can generally seek to reduce WA in order to limit drive wear.

Reducing the WA using the GC policies in at least one embodiment can result in tangible advantages and benefits. For example, reducing the WA using a GC policy in accordance with the techniques of the present disclosure can include reducing the background or extra I/Os performed when writing or storing new user content or data, thereby improving the I/O performance of the data storage system. As another example, reducing the WA using a GC policy in accordance with the techniques of the present disclosure can reduce the background or extra I/Os performed when writing new data, thereby generally reducing the SSDs' wear level. As a result, an embodiment of the techniques of the present disclosure can use GC policies that reduce WA and can prolong the lifetime of the SSDs used by the LSS. In at least one embodiment using the techniques of the present disclosure in one or more storage systems or appliances, the resulting I/O performance improvement, reduction in wear of the SSDs, and extended SSD lifetime can be characterized as tangible benefits desired by data storage system vendors and customers alike.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more non-volatile solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, any of: SLC, MLC, TLC and/or QLC drives.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PD 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
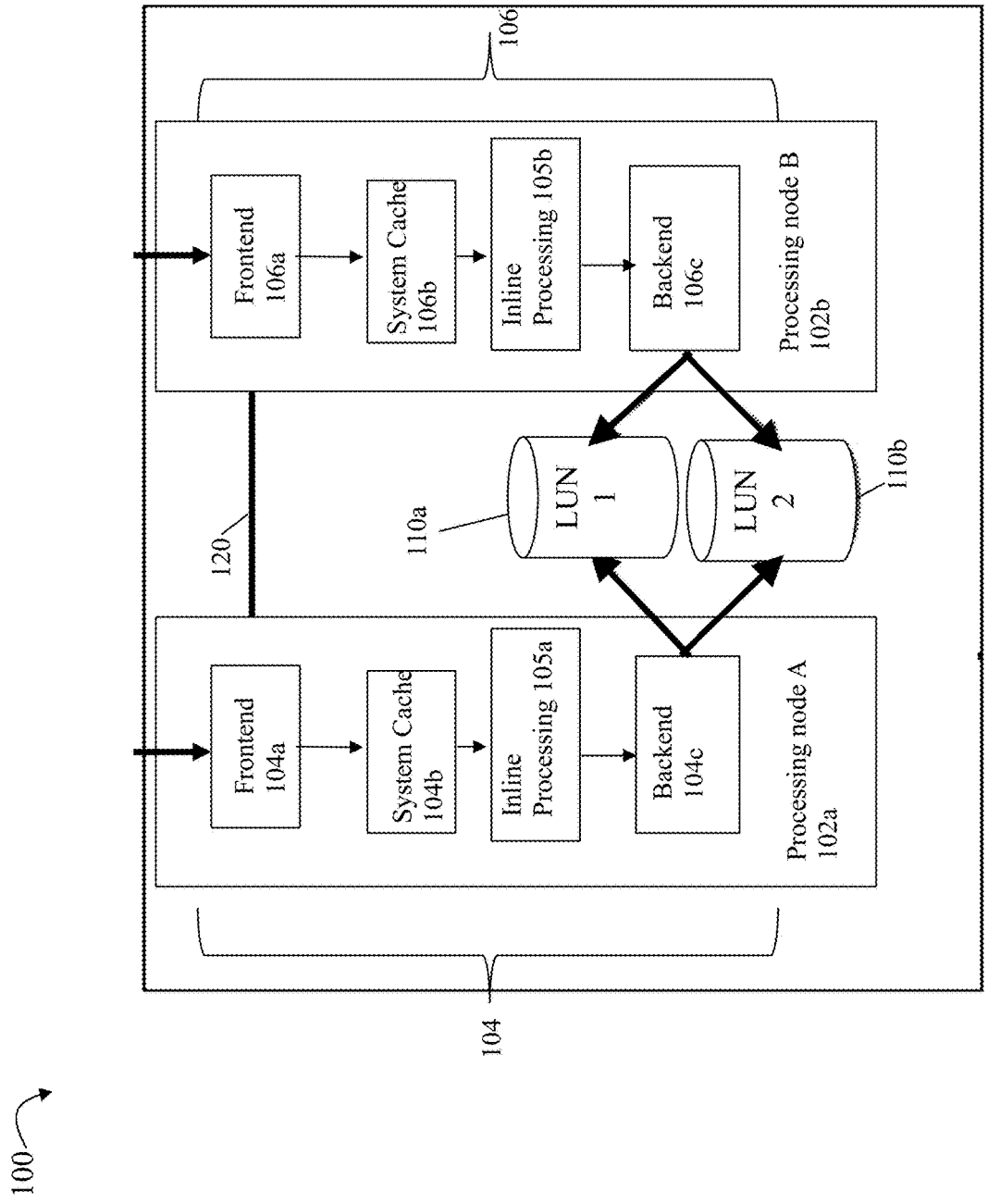
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
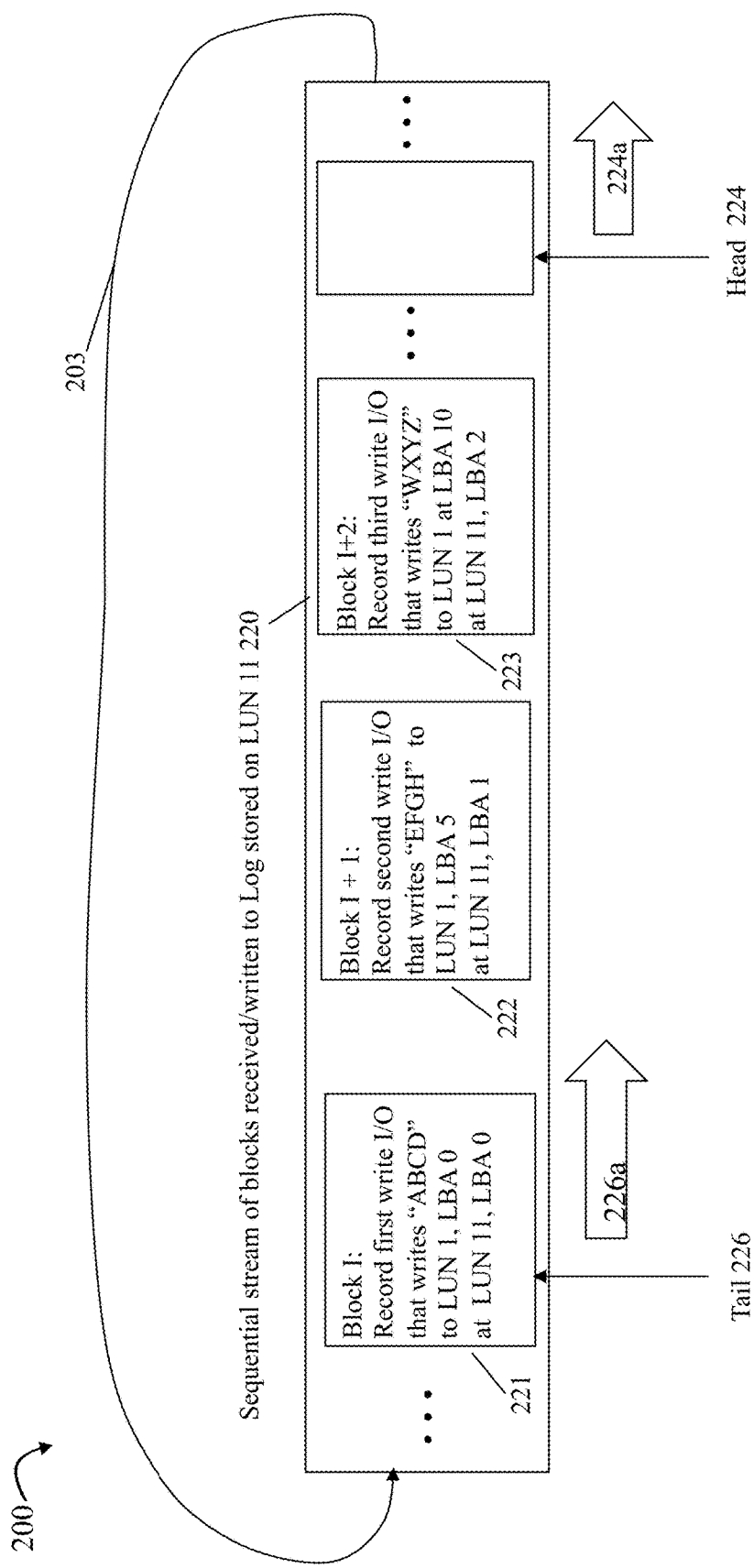
FIGS. 3, 4, 5 and 6 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
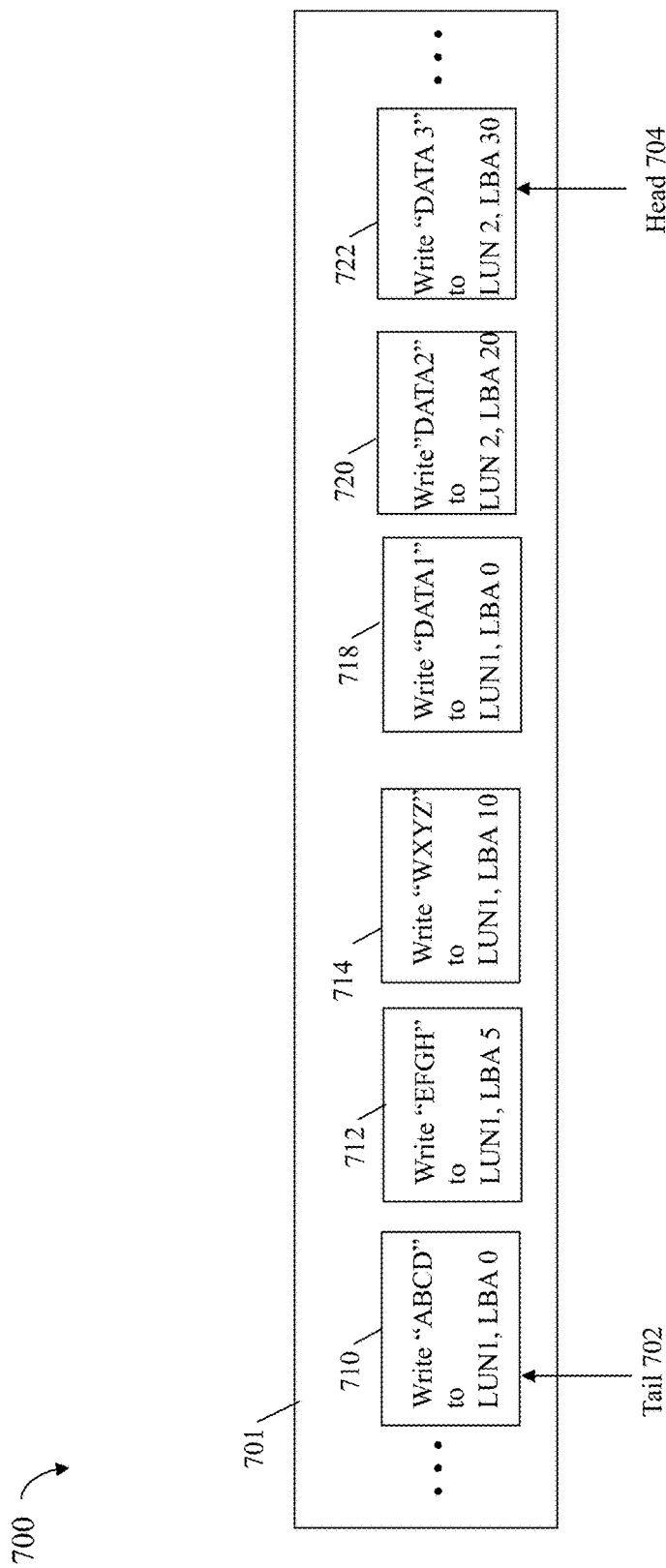

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
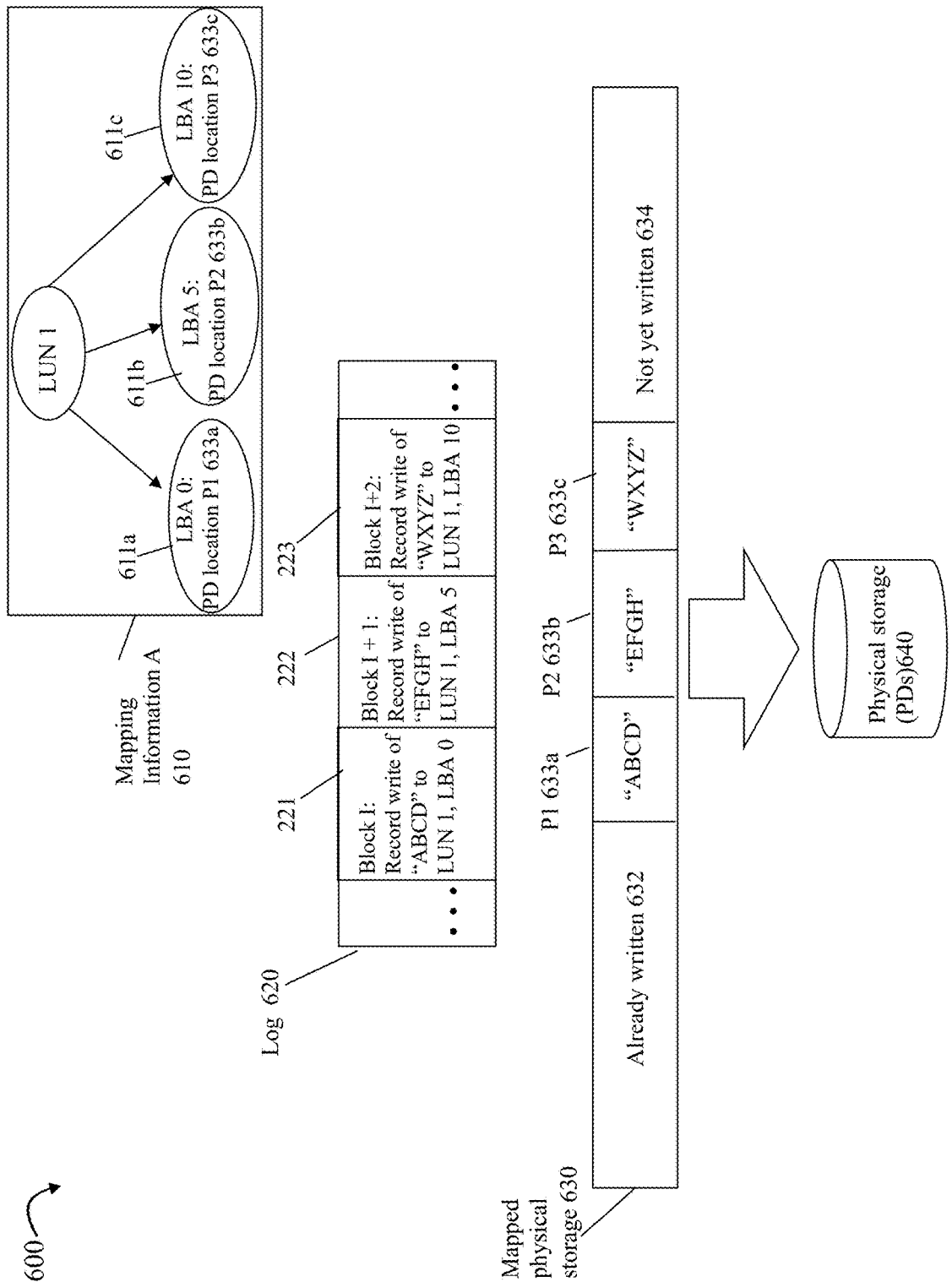

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system (or LSS) as discussed herein, as recorded writes in the log are processed and flushed from the log, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs.

Figure 6:
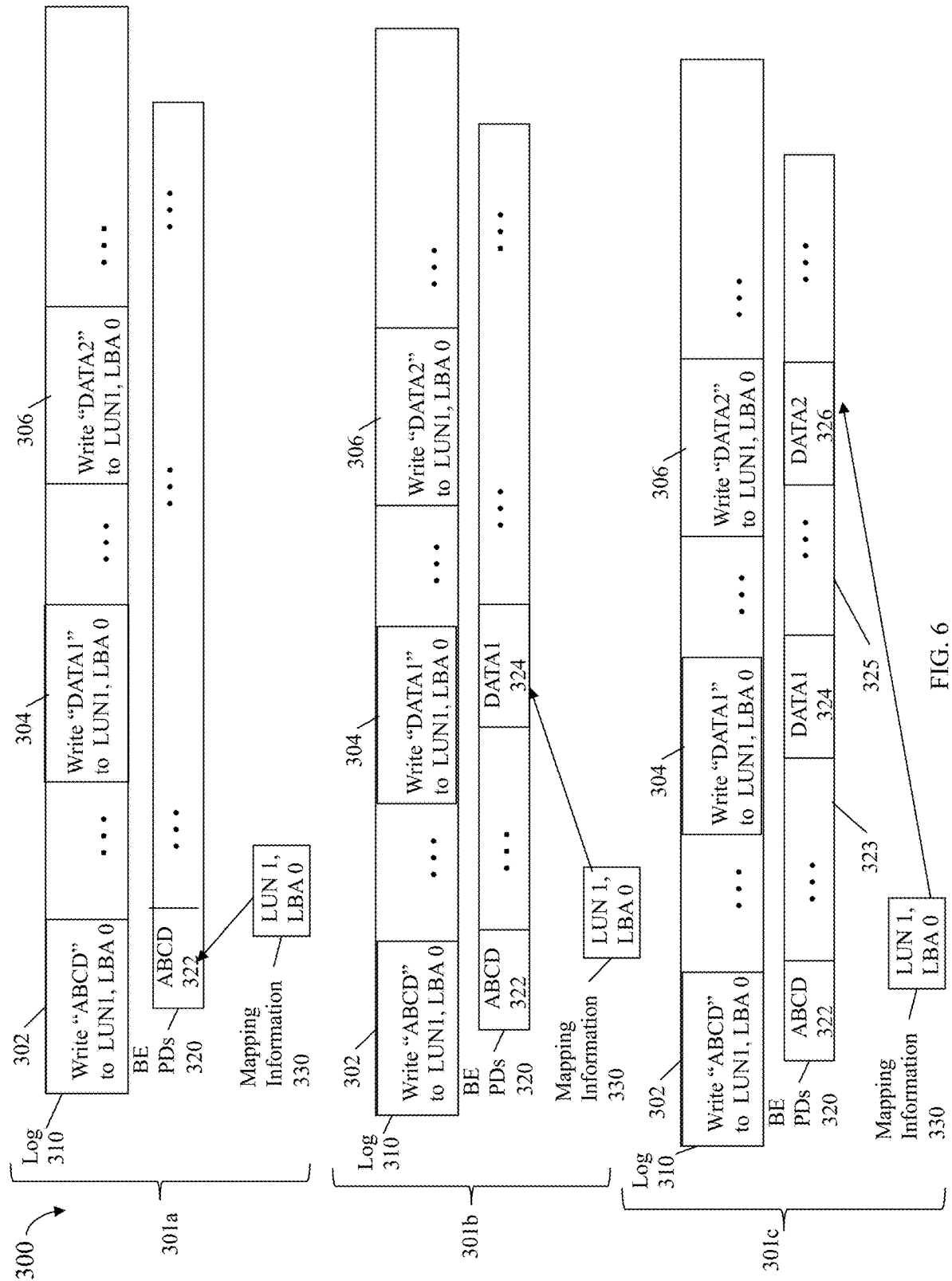

For example with reference to FIG. 6, the element 301a can denote the state of the log file 310, BE PDs 320 and mapping information 330 at a first point in time T1 after processing the record 302 for a first write of "ABCD" to the logical address LUN A, LBA 0. The data written "ABCD" by the recorded write of 302 can be stored at the BE PD location 322. Thus, flushing the log record 302 results in storing the write data "ABCD" to the BE PD location 322 and additionally updating the mapping information 330 to reference the BE PD location 322. The mapping information 330 denotes the metadata used to map the logical address LUN 1, LBA 0 to the current physical location on the BE PDs containing the user data or content stored at the logical address LUN 1, LBA 0. After the log record 302 is flushed from the log 310, the record 302 is available and can be subsequently reclaimed for reuse for logging other operations in the log 310.

At a second point in time T2 subsequent to T1, the log record 304 can be processed and flushed to the BE PDs 320. The element 301b denotes the state of the log file 310, BE PDs 320 and mapping information 330 at the second point in time T2 after processing the record 304 for a second write of "DATA1" to the logical address LUN A, LBA 0. The data written "DATA1" by the recorded write of 304 can be stored at the BE PD location 324. Thus, flushing the log record 304 results in storing the write data "DATA1" to the BE PD location 324 and additionally updating the mapping information 330 to reference the BE PD location 324 denoting the physical location containing the data stored at the LUN 1, LBA 0 at the time T2. Additionally, the PD location 322 can be invalidated since it no longer contains valid current data for the logical address LUN 1, LBA 0, whereby the PD location 322 can be available for reuse. After the log record 304 is flushed from the log 310, the record 304 is available and can be subsequently reclaimed for reuse for logging other operations in the log 310.

At a third point in time T3 subsequent to T2, the log record 306 can be processed and flushed to the BE PDs 320. The element 301c denotes the state of the log file 310, BE PDs 320 and mapping information 330 at the third point in time T3 after processing the record 306 for a third write of "DATA2" to the logical address LUN A, LBA 0. The data written "DATA2" by the recorded write of 306 can be stored at the BE PD location 326. Thus, flushing the log record 306 results in storing the write data "DATA2" to the BE PD location 326 and additionally updating the mapping information 330 to reference the BE PD location 326 denoting the physical location containing the data stored at the LUN 1, LBA 0 at the time T3. Additionally, the PD location 324 can be invalidated since it no longer contains valid current data for the logical address LUN 1, LBA 0, whereby the PD location 324 can be available for reuse. After the log record 306 is flushed from the log 310, the record 306 is available and can be subsequently reclaimed for reuse for logging other operations in the log 310.

As illustrated by the elements 301a-c, over time, the physical storage locations 322, 324 of the BE PDs 320 become free and available for reuse. The other physical storage locations 323, 325 and 326 can still contain valid data. Thus, the free, available reusable physical storage locations 322, 324 can form holes or segments interspersed among the other portions 323, 325, 326 containing valid data. More generally, the size of the holes 322, 324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

In data storage systems implementing an LSS such discussed herein, garbage collection (sometimes referred to as GC) can be performed by the data storage system at various times in an embodiment. Garbage collection processing can be performed by the data storage system on the BE PDs to aggregate allocated stored data blocks with valid data to eliminate free unused physical storage locations (containing invalid or stale content) that can be interspersed between the data blocks containing valid data. Such aggregation can include physically copying or moving data blocks of valid user data stored at various physical locations on BE nonvolatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation. After the valid data blocks, such as 323, 325 and 326 at the time T3, are relocated from their source locations, the storage locations 322, 323, 324, 325 and 326 denote a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

A specified size or chunk of physical storage of the BE PDs can be referred to as a physical large block or PLB. In at least one embodiment, garbage collection can be performed on physical storage units that are PLBs. In at least one embodiment, each PLB can be 2 MBs (megabytes) in size. Within a single PLB, the valid data and the holes (e.g., containing invalid data or designated as an unused portion) can be interspersed since, for example, write granularity size units can be a smaller size such as 4K chunks or blocks.

Utilization (U), such as of a single PLB, can be expressed as a percentage or ratio of allocated consumed storage that contains valid data with respect to the total storage capacity of the PLB. For example, if 25% of the PLB is allocated and includes valid data and the remaining 75% of the PLB is unused and free (e.g., contains invalid data or holes of unused storage), the utilization for the single PLB is 25%. Generally, the lower the per PLB utilization, the more efficient the garbage collection since larger amounts of free capacity are reclaimed and aggregated from PLBs with lower utilization. Additionally, in connection with GC in at least one embodiment, it can be desirable to move content from source PLBs having low PLB utilization since the lower the PLB utilization, the less amount of valid content to be moved. For example, consider 2 source PLBs that contain a mixture of 50% valid data and 50% invalid data or holes (e.g., each PLB has a 50% utilization with the remaining 50% of the PLB containing invalid or free holes of storage). Garbage collection can be performed to consolidate the valid data in the 2 source PLBs into a single target PLB by copying the valid data from the 2 source PLBs to the target PLB. The foregoing consolidation results in a net gain of 1 free PLB by freeing the 2 source PLBs, and consuming or using the single target PLB that contains the consolidated valid data from the 2 original source PLBs. As another example, consider 4 source PLBs each having a 25% utilization (e.g., each PLB contains 25% valid data with the remaining 75% of the PLB containing invalid or free holes of storage). In this case, garbage collection can be performed to consolidate the valid data of the 4 source PLBs into a single target PLB by copying the valid data from the 4 source PLBs to the target PLB. The foregoing consolidation results in a net gain of 3 free PLBs by freeing the 4 source PLBs, and consuming or using the single target PLB that contains the consolidated valid data from the 4 original source PLBs. In this latter scenario, the same amount of valid data or content is moved to the single target PLB as in the former scenario (with 2 source PLBs each having 50% PLB utilization), but the latter scenario results in a net gain of 3 PLBs in comparison to a net gain of 1 PLB in the former scenario.

In a data storage system implementing an LSS, garbage collection can be performed by the data storage system in a continuous manner to manage its BE PDs and reclaim physical storage of holes including unused storage or storage with invalid data. The garbage collection results in performing additional overhead operations such as additional read and write operations in connection with reading valid data from the source PLBs and writing the valid data of the source PLBs to a target PLB. The total writes performed by the data storage system in connection with writing new valid data (e.g., such as data written by a host) to a single unit of storage includes the overhead or additional writes performed by the data storage system in connection with garbage collection and management of the system's BE PDs in order to free the single unit of storage, such as the single PLB, given that the source PLBs from which the valid data is read have a certain PLB utilization.

WA can include the additional writes performed in connection with such GC processing. In at least one embodiment, GC processing can run when the system has idle cycles, or more generally, time periods of no workload or a minimal workload (e.g., such as less than a specified minimum workload or utilization measured using any one or more suitable metrics). In at least one embodiment, GC can run with a goal of generating one or more free PLBs (e.g., with 0% utilization). In at least one embodiment, each PLB can have a size such as 2MBs, or more generally, any other suitable size. In at least one embodiment, a PLB can have a size selected in connection with the size of a stripe of data or content that can be written across multiple BE PDs included in a RAID configuration. In at least one embodiment, content or data can be written to BE PDs in PLB size units. In this manner in at least one embodiment, a PLB can denote a single stripe of storage.

In at least one embodiment GC processing can include combining N (where N is generally an integer greater than one) partially filled or populated source PLBs (e.g., partially filled with valid data or content), where the valid data is moved from the source PLBs to one more target free PLBs to generate at least 1 net free PLB. The valid data copied or moved by GC processing causes additional writes included in the WA on the drives. Excessive WA can lead to excessive drive-wear of non-volatile SSD drive types. The WA can be characterized as proportional to the utilization (U) of the PLBs used in the GC operation. For example, in a first scenario, four 25% utilized sources PLBs can be garbage collected to create 3 free PLBs; and in a second scenario two 50% utilized PLBs garbage collected to generate one free PLB. Both the foregoing first and second scenarios move or copy the same amount of valid data or content. However, the foregoing first scenario results in generating a larger number of net free PLBs than the foregoing second scenario. As a result in at least one embodiment, GC processing can select to perform GC processing in accordance with the first scenario noted above rather than the second scenario noted above. In particular in at least one embodiment, GC processing can select source PLBs having the lowest utilization for combining valid content thereof on generally one or more free target PLBs. For example in at least one embodiment where there are source PLBs having both 25% utilization and also 50% utilization, GC processing can select four 25% utilized source PLBs from which to aggregate valid content to a single target free PLBs.

Accordingly, in at least one embodiment in accordance with the techniques of the present disclosure, the number of GC operations performed and the quality of PLBs selected as source PLBs can play an important role in controlling WA of the drives. The quality of a PLB can relate to the utilization (U) and/or percentage of the PLB storage capacity that is free (F) or unused, as discussed below in more detail. Generally in at least one embodiment, a first PLB can be characterized as having a higher quality than a second PLB with respect to GC processing if the first PLB has a first utilization or U value that is less than a second utilization or U value of the second PLB.

In at least one embodiment, the techniques of the present disclosure include one or more GC policies that can selectively throttle, vary and/or reduce when GC processing is performed. In at least one embodiment, the techniques of the present disclosure include one or more policies for selecting better quality source PLBs having lower or the lowest utilization (relative to other source PLB candidates) to reduce WA and hence reduce drive wear.

In at least one embodiment, the techniques of the present disclosure can selectively control, vary, throttle and/or reduce GC processing performed based, at least in part, on: the number of free PLBs in the system; and/or the quality of partial PLBs selected as source PLBs for GC processing. In at least one embodiment, a GC policy in accordance with the techniques of the present disclosure can result in optimizing and reducing the amount of GC processing performed to thereby reduce corresponding additional writes performed. The additional writes performed in connection with GC can be included in WA. Thus by reducing GC processing in at least one embodiment, WA is reduced to thereby result in a reduction on drive wear with respect to non-volatile SSDs of BE non-volatile storage used by an LSS of a storage system.

Consistent with the above discussion, new valid data can be written to a free PLB as corresponding recorded write operations are flushed from a log. In order to obtain the free PLB in an LSS, the data storage system can perform additional or extra writes as part of its GC processing to manage the BE PDs. The additional writes included in the WA are thus generated internally by the data storage system's GC processing performed for BE PD management.

As noted above, a PLB can be characterized as having a specified utilization (U) denoting a percentage of storage of the PLB storing valid content of data. A PLB can also be characterized as having a specified percentage of free or unused capacity F of the source PLBs. In one aspect, F can be characterized and expressed as U's complement.

Generally, the utilization, U, can be expressed as a percentage as noted above with respect to a total capacity, T, denoting 100% or 1. Thus, the total capacity T can denote 1.0 or 100% can be expressed using the utilization U and its complement, the free or unused storage capacity, F, as in EQUATION 1:

$$F+U=1 \qquad \text{EQUATION 1}$$

Also, the EQUATION 1A follows from EQUATION 1, $$F=1-U \qquad \text{EQUATION 1A}$$

To further illustrate write amplification WA with respect to GC performed by the data storage system in connection with managing the storage of its BE PDs such as in an LSS, consider values for F of the source PLBs as well as value for U or utilization of the source PLBs with reference to FIG. 7.

In at least one embodiment, a PLB may have a utilization or U=100% at a point in time where the PLB stores valid first content for multiple logical addresses. At a later point in time as new content is written to the multiple logical addresses as corresponding writes are flushed from the log, portions of the valid first content can become stale or invalid. Thus the PLB's utilization tends to generally decrease with time as its content becomes stale, whereby the PLB can be characterized as a partially filled PLB including holes of unused storage of invalid, stale content interspersed among other valid data. In at least one embodiment, GC processing can include generally combining valid content of multiple partially filled source PLBs into a highly utilized target PLB to generate one or more free PLBs.

Referring to FIG. 7, shown is a table 400 of various values and scenarios in connection with generating 1 net free PLB as part of garbage collection processing in a LSS in an embodiment in accordance with the present disclosure. The table 400 includes the column 402 of various values for F denoting different percentages of free or unused PLB storage; the column 403 of various values of U denoting different percentages of consumed or used PLB storage containing valid content or data; the column 404 denoting the number of source PLBs needed to generate 1 net free PLB that can be used to store new data (e.g., newly written host or other client data); and the column 406 denoting the number of target PLBs needed to generate 1 net free PLB that can be used to store new data (e.g., newly written host or other client data). Each row 408-414 of values denotes a number of source PLBs (404) and target PLBs (406) needed to generate 1 net free PLB, where each of the source PLBs has a specified value for F (404) denoting a percentage of free or unused storage of each source PLB. For a given row of the table 400, the column 404 denotes the number of source PLBs from which valid data is read and then written to one of the number of target PLBs (denoted by column 406) to consolidate the valid data of the source PLBs into the target PLBs.

Within each row 408, 410, 412 and 414, the U and F values of the same respective row equal 100% denoting the total capacity of a single source PLB. The U and F values of the same respective row are in accordance with EQUATIONs 1 and 1A above.

The row 408 indicates that 2 source PLBs (column 404) that each contain 50% (column 402) of free or unused storage capacity (or 50% utilization column 403) can have all their valid data copied to a single target PLB (column 406).

The row 410 indicates that 3 source PLBs (column 404) that each contain 33% (column 402) of free or unused storage capacity (or 67% utilization column 403) can have all their valid data copied to two PLBs (column 406).

The row 412 indicates that 4 source PLBs (column 404) that each contain 25% (column 402) of free or unused storage capacity (or 75% utilization column 403) can have all their valid data copied to three PLBs (column 406).

The row 414 indicates that 10 source PLBs (column 404) that each contain 10% (column 402) of free or unused storage capacity (or 90% utilization column 403) can have all their valid data copied to nine PLBs (column 406).

Generally in at least one embodiment, a first PLB can be characterized as having a higher quality than a second PLB with respect to GC processing if the first PLB has a first utilization or U value that is less than a second utilization or U value of the second PLB, where the first and second U values denote respective percentages of PLB capacity that are consumed, used and/or store valid content. Generally in at least one embodiment, a first PLB can be characterized as having a higher quality than a second PLB with respect to GC processing if the first PLB has a first F value that is more than a second F value of the second PLB, where the first and second F values denote respective percentages of PLB capacity that are free, unused and/or store invalid or stale content.

As further illustrated in connection with FIG. 7, it can be seen that selecting source PLBs with lower or lowest utilization (U values) of all source PLB candidates, and selecting higher or highest F values of all source PLB candidates can be performed in connection with GC processing in efforts to reduce or minimize the additional GC writes performed when generating net free PLBs. For example, as can be seen in connection with FIG. 7, the amount of valid content moved or copied from source PLBs to generate a single free PLB increases as the U values of the source PLBs increases. In a similar manner, as can be seen in connection with FIG. 7, the amount of valid content moved or copied from source PLBs to generate a single free PLB increases as the F values of the source PLBs decreases. With respect to FIG. 7, the foregoing denotes the ordering of the rows of the table in the example 400 from "least amount of valid content copied or moved by GC processing" to most amount of valid content copied or moved by GC processing" in order to generate a single net free PLB: 408, 410, 412 and 414 (where 408 has the least amount of valid content copied or moved by GC processing, of all rows 408, 410, 412 and 414, to generate a single net free PLB; and where 414 has most amount of valid content copied or moved by GC processing, of all rows 408, 410, 412 and 414, to generate a single net free PLB). In at least one embodiment where partially filled source PLBs are available as candidates for GC processing, GC processing can select partially filled source PLBs as those having the smallest or lowest U values of all PLB candidates.

It should be noted that FIG. 7 illustrates various scenarios where valid content from multiple partially filled source PLBs are combined and stored on one or more target PLBs to generate one net free PLB. More generally, GC processing in at least one embodiment can combine valid content from multiple partially filled source PLBs and store the combined valid content on one or more target PLBs to generate one or more net free PLBs. Some examples where more than one net free PLB can be generated by GC processing are discussed elsewhere herein. For example in at least one embodiment as noted above four source PLBs having 25% utilization can have their valid content moved to a single free target PLB thereby generating 3 net free PLBs.

In addition to using techniques of the present disclosure to limit or reduce WA in connection with GC processing and policies, the techniques of the present disclosure can also be used to limit or reduce WA in connection with another operation referred to herein as compact and append.

In at least one embodiment, compact and append (sometimes referred to herein as CA or C and A) can be characterized as an operation that can be optionally performed during flushing. Put another way, CA is an operation that, in at least one embodiment, can be performed while the system is flushing entries from the log. CA processing in at least one embodiment does not result in one or more net free PLBs that are completely free and available for reuse. CA processing can include having a single source PLB that is partially filled with valid content and also contains holes of unused storage. Consistent with other discussion herein, the holes of unused storage can include, for example, invalid or stale content of a first logical address in an LSS that has been replaced with more recently written new content to the first logical address. CA processing can use a partially filled source PLB where CA processing includes copying or moving valid content or data within the partially filled source PLB such that the valid content on the PLB is compacted and stored in consecutive contiguous locations. Put another way, as a result of compacting content of the partially filled PLB in CA processing, the valid content of the PLB is stored in a single contiguous region at one end of the PLB thereby removing any holes that were previously interspersed between valid data portions. After compaction of CA processing, all unused storage of the PLB is also compacted as a single contiguous region of the PLB. In this manner, the single contiguous region of unused storage of the PLB (also including the compacted single contiguous region of valid content) can subsequently be reused for storing or appending newly written content or data of recorded write operations flushed from the log. For example, if a partial PLB has CA processing that can be performed in at least one embodiment is illustrated in FIG. 8 discussed below.

Figure 8:
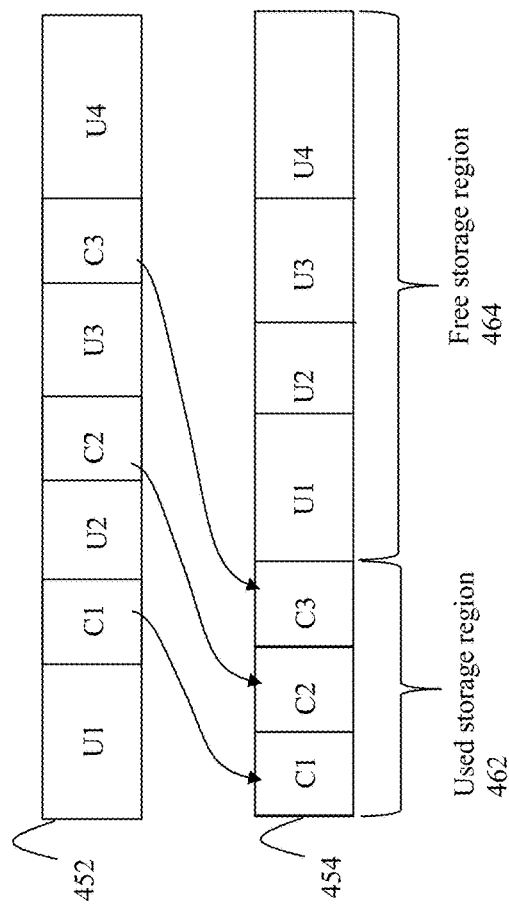
FIG. 8 is an example illustrating compaction of valid content of a partially filled storage block that can be performed in at least one embodiment in accordance with the techniques of the present disclosure.

With reference to the example 450 of FIG. 8, the element 452 can denote a single PLB which is partially filled with valid content C1, C2 and C3. As can be seen in 452, C1, C2 and C3 are not stored contiguously in the PLB 450 such that the PLB 450 can have holes of invalid data or unused storage areas denoted as U1-U4. Thus, element 452 can denote the state of the PLB at a first point in time. Subsequent to the first point in time, a compaction operation can be performed with respect to the partially filled PLB 452 to store the content of the partially filled PLB in a contiguous region at one end of the PLB to eliminate interspersed holes of invalid content or unused storage. The element 454 illustrates the partially filled PLB after compaction where the existing content C1, C2 and C3 of the PLB 454 can be located in one contiguous region 462 with the remaining free storage region included in another contiguous region 464. After compaction of the PLB as illustrated in 454, newly written content of recorded write entries flushed from the log can be stored in the free region 464 of the partially filled PLB 454.

Subsequent to the compaction, the newly written content or data can be stored in the unused or free storage region 464 on the partially filled PLB 450 along with the compacted existing content (462) of the PLB 450. The processing performed in connection with FIG. 8 can also be referred to herein as compact and append or compaction and appending (e.g., C and A, or CA) 8 processing.

In at least one embodiment, the PLB 452 and 454 can denote the same PLB where compaction results in compacting valid content of a single PLB such that all valid content is stored in a single contiguous region at one end of the PLB, and where new content can then be appended to or stored in the remaining free storage that also now forms a second contiguous region of the PLB.

Alternatively, in at least one embodiment, the PLB 452 and the PLB 454 can also be 2 different PLBs where the PLB 452 denotes a source PLB that is partially filled with valid content, and where the PLB 454 denotes a target PLB that can be a free PLB (e.g., PLB utilization or U=0%, free or F=100%). In this case, the compaction operation aggregates the content $C_1$-$C_3$ of the source PLB 1452 and stores the aggregated content $C_1$-$C_3$ as a compacted single contiguous data portion (1462) on the target PLB 1454 at one end of the PLB 1454. Subsequently additional content can be appended to the existing content of used storage region 1462, where the additional content can be stored in the free storage region 1464.

In at least one embodiment, compaction as discussed in connection with FIG. 8, and more generally CA processing, can be performed if the current number of free PLBs (e.g., each having U=0% or F=100%) is less than a minimum threshold, such as the threshold of "CA min free PLBs" as expressed in EQUATION 3 discussed elsewhere herein. In at least one embodiment, CA processing can be performed during flushing and can adversely impact flush processing or performance. In at least one embodiment, CA processing can be performed concurrently or in parallel while also flushing recorded writes and possibly other recorded operations from the log. Additionally, performing CA processing results in additional writes or WA incurred as a result of moving or copying valid data in connection with the CA processing. As such, it can be desirable to selectively limit when CA processing is performed in efforts to reduce WA incurred as a result of CA processing.

In at least one embodiment in a multicore or multiprocessor system, compaction (of CA processing) can be performed on a first core or CPU in parallel while a second core or CPU flushes recorded entries from the log. Once a partially filled PLB B1 has been compacted, the unused portion or region of B1 can then be used to store newly written content as corresponding writes are flushed from the log.

In at least one embodiment, compaction as described herein in connection with CA processing can be triggered when the current number of free PLBs of non-volatile BE PDs (available for storing CA min free PLBs) falls below a minimum threshold, such as CA min free PLBs. In at least one embodiment, CA processing can continue to be performed during flushing until the current number of free PLBs is above the minimum threshold. As a variation, once CA processing is triggered by the current number of free PLBs falling below the minimum threshold, CA processing can continue to be performed until the current number of free PLBs reach a specified quantity Q1, where Q1 can generally be some specified amount above the minimum threshold.

In connection with GC processing, a system not operating in accordance with the techniques of the present disclosure can perform GC processing when the system has idle cycles or more generally a sufficiently low workload or utilization below a specified threshold independent of (or regardless of) the number of free PLBs available in the system for storing content written by writes flushed from the log.

In contrast to the foregoing, in at least one embodiment of the techniques of the present disclosure, if a system has at least a specified minimum number of free PLBs available for storing content written by writes flushed from the log, then GC is not performed even though the system has idle cycles or more generally a sufficiently low workload or utilization below a specified threshold. Put another way in at least one embodiment in accordance with the techniques of the present disclosure, if 1) the system has idle cycles or more generally a sufficiently low workload or utilization below a specified threshold; and 2) the number of PLBs available (for storing content written by writes flushed from the log) is below the specified minimum, then GC processing can be performed.

In at least one embodiment in accordance with the techniques of the present disclosure, if 1) the system has idle cycles or more generally a sufficiently low workload or utilization below a specified threshold; and 2) the number of PLBs available (for storing content written by writes flushed from the log) is equal to, or above, the specified minimum, then GC processing is not performed. In this case where, at a point in time, the number of PLBs is at or above the specified minimum, performing GC can be deemed not needed at the point in time since having additional free PLBs obtained as a result of GC would not facilitate improving the system such as would not result in improvements in system performance. Additionally, performing such GC processing at the point in time where GC processing is deemed unnecessary would result in additional WA thereby increasing wear on the SSDs of the BE non-volatile storage.

In at least one embodiment, by further delaying GC processing to points in time when the number of free PLBs is below the minimum threshold, utilization of PLB candidates can further decrease due to multiple writes or overwrites performed with respect to a same logical address, thereby improving the quality or F value of PLB candidates.

In at least one embodiment, the minimum number of free PLBs needed in a system to avoid triggering GC processing can be referred to herein as "GC min free PLBs" discussed below in more detail.

In at least one embodiment in accordance with the techniques of the present disclosure, if 1) the system has idle cycles or more generally a sufficiently low workload or utilization below a specified threshold; and 2) the number of PLBs available (for storing content written by writes flushed from the log) is below the specified minimum, GC min free PLBs, then GC processing can be performed.

In at least one embodiment in accordance with the techniques of the present disclosure, if 1) the system has idle cycles or more generally a sufficiently low workload or utilization below a specified threshold; and 2) the number of PLBs available (for storing content written by writes flushed from the log) is equal to, or above, the specified minimum, GC min free PLBs, then GC processing is not performed.

Before further discussing how GC min free PLBs can be determined in at least one embodiment, additional EQUATIONS and terms are first presented in the following paragraphs.

In at least one embodiment, a linear weighted moving average of flushes per specified time interval can be determined as expressed in EQUATION 2 below.

$$LWMAf = \frac{\sum (Fj * Wj)}{\sum Wj} \qquad \text{EQUATION 2}$$

where:
A) "LWMAf" is the linear weighted moving average of flushes per time interval. In at least one embodiment, the time interval can be a second such that LWMAf denotes the weighted moving average of flushes per second (e.g., weighted moving average of a flush rate denoting a number of entries of the log flushed per second). More generally, the time interval can be a second or any other suitable time interval.
B) "n" denotes the number of time intervals being considered. Generally, "n" can be any integer value greater than 1. Interval "n" can denote the most recent time interval, such that "n−1" then denotes the interval immediately prior to interval n, "n−2" denotes the interval immediately prior to interval "n−1", and so on.
C) "Fj" generally denotes a number of observed or measured flushes in a particular time interval instance "j", where j can be a value in the inclusive range from 1 to n, assuming n is an integer greater than 1. Thus Fn can denote the number of flushes measured or observed during the most recent time interval; Fn−1 can denote the number of flushes measured or observed during the time interval immediately prior to the interval n; Fn−2 can denote the number of flushes measured or observed during the time interval immediately prior to the interval "n−1", and so on, depending on "n" the number of time intervals considered.

D) Wj denotes the assigned weight to interval j, where j can be a value in the inclusive range from 1 to n, assuming n is an integer greater than 1. In at least one embodiment, the more recent the particular time interval, the higher the weight given or assigned to the particular time interval. In at least one such embodiment, generally a first interval is assigned a first weight and a second interval is assigned a second weight, where if the first interval is more recent (in time) than the second interval, the first weight is greater or higher than the second weight. Thus in at least one embodiment, the highest or largest weight of all weights Wj assigned to an interval can be assigned to the most recent interval n, the second highest or largest weight of all weights Wj assigned to an interval can be assigned to the interval n−1, the third highest or largest of all weights Wj assigned to an interval can be assigned to the interval n−2, and so on. In this manner the weight associated with each particular interval considered can generally decrease with the age of the particular interval relative to other intervals considered.

E) Σ(Fj*Wj) denotes the mathematical sum of "n" terms or mathematical products, for values of j ranging inclusively from 1 to n. Each jth term or product of the "n" terms or products is a result of multiplying Fj*Wj with respect to the jth interval.

and

F) ΣW denotes the mathematical sum of all weights Wj summed or added together across all n intervals considered, where j=1 to n, inclusively.

Based on the above regarding EQUATION 2, EQUATION 2 can be further expanded and expressed as in EQUATION 2A below:

$$LWMAf = \frac{(Fn*Wn) + (F_{n-1}*W_{n-1}) + (F_{n-2}*W_{n-2}) + \ldots}{\sum W} \quad \text{EQUATION 2A}$$

Additionally, the numerator of EQUATION 2A is generally an expansion of the numerator as expressed in EQUATION 2, where the intervals have a relative ordering in decreasing time order of n, n−1, n−2, and so on, such that n denotes the most recent time interval, n−1 denotes the time interval immediately prior to interval n, n−2 denotes the time interval immediately prior to interval n−1, and so on.

To further illustrate, for example, if the time interval is a second and n=3, then the numerator of both EQUATIONS 2 and 2A includes F3, F2 and F1 for the most 3 recent time intervals or 3 seconds, where F3 denotes a first observed or measured number of flushes during time interval or time period T3 (e.g., n) of one second, F2 denotes a second observed or measured number of flushes during time interval or time period T2 (e.g., n−1) of one second, F1 denotes a second observed or measured number of flushes during time interval or time period T1 (e.g., n−2) of one second, where the time intervals or periods have a sequential consecutive ordering of occurrence of in increasing time order of T1, T2 and T3, with T3 being the most recent time interval during which a number of flushes is observed and with T1 being the oldest prior time interval during which a number of flushes is observed. In at least one embodiment, the weights W3, W2 and W1 can be respectively assigned to F3, F2 and F1, where W3>W2>W1. In this example ΣW can be the sum of W3+W2+W.

$$CA \text{ min free PLBs} = N1 * MAX\ FLUSH \quad \text{EQUATION 3}$$

where:

A) CA min free PLBs denotes a minimum number of free PLBs in the system available for storing written data or content such as flushed from the log to avoid or not trigger performing compact and append (C and A) processing. In at least one embodiment, a system may perform C and A processing when the current number of free PLBs in the system, available for storing written data or content such as flushed from the log, is less than the threshold denoted by CA min free PLBs.

B) MAX FLUSH denotes the maximum number of parallel flushes supported by the system. MAX FLUSH can thus be used as an upper bound or maximum number of potential flush operations flushing entries from the log that can be performed in parallel in the system in a single time interval such as each second. MAX FLUSH can be based, at least in part, on the number of CPU cores that can perform flushing of the log in parallel. For example, assume that up to 50 CPU cores are allowed to perform flushing in parallel to flush entries from the log in parallel. If each core can perform a single flush operation, then MAX FLUSH can be 50. As a variation, also assume each core is capable of executing 5 operations in parallel. In this case, each core can be capable of performing up to 5 flush operations in parallel, whereby MAX FLUSH can be 250 (where 250=50*5), where 50 denotes the number of cores that can execute flushing in parallel, and where 5 denotes the number of flush operations that can be performed in parallel by each one of the 50 cores. In at least one embodiment, it can be assumed that each flush that can be performed in parallel can consume a single PLB such that MAX FLUSH can generally denote a number of PLBs. Continuing with the above example, if a maximum of 250 flush operations can potentially be performed in parallel, then a maximum of 250 PLBs can be consumed by the 250 flush operations performed in parallel in a single time interval such as a single second. Thus MAX FLUSH can denote a maximum number of PLBs that can be consumed by flushing the log in parallel in a single time interval, such as a single second or per second.

and

C) N1 is a constant factor. In at least one embodiment, N1 can be a value in the inclusive range from 1 to 10. N1 can be determined by experimentation and can vary with embodiment. In at least one embodiment, N1 can be characterized as a factor introduced to account for possible variations and/or errors in estimating CA min free PLBs.

In at least one embodiment, CA min free PLBs can denote an estimate regarding an upper bound of the number of PLBs consumed by flushing from the log in a single time interval.

$$GC \text{ min free PLBs} = (NumPLB[(LWMAf)]*X) + CA \text{ min free PLBs} \quad \text{EQUATION 4}$$

where:

A) "GC min free PLBs" denotes the minimum number of free PLBs needed in the system to avoid or not trigger performing GC processing. In at least one embodiment, a system may perform GC processing when two conditions evaluate to true, where the first condition 1 is:

the system is idle or generally has a low workload or system utilization below a minimum workload; and where the second condition 2 is: when the current number of free PLBs in the system, available for storing written data or content such as flushed from the log, is less than the threshold denoted by the GC min free PLBs, as expressed in EQUATION 3. Thus in at least one embodiment, GC processing can be performed if both of the foregoing 2 conditions are true. In at least one embodiment, a system can be determined as idle or as having a sufficiently low workload below a threshold based on CPU utilization or utilization across the cores of the storage system. For example, in at least one embodiment having K cores, the average core utilization across the K cores can be determined. If the average utilization is below a specified threshold, then the system can be characterized as having an idle or sufficiently low workload such that GC processing can be performed if the other remaining condition 2) above is also true. Generally, any one or more suitable metrics, alone or in a suitable combination, can be used to measure the current workload or system utilization for determining when the system is idle or has a sufficiently low workload or system utilization below a specified threshold in connection with the foregoing condition 1 for GC processing. As another example, the current workload of the system can be measured in terms of an overall I/O rate, such as number of host or client I/Os per second, such that the above-noted condition 1 can evaluate to true if the measured host or front-end IOPS is less than a specified threshold.

B) LWMAf can denote the linear weighted moving average of flushes per time interval. In at least one embodiment, LWMAf of EQUATION 4 can be determined as expressed using EQUATIONs 2 and 2A.

C) X can be a constant factor determined by experimentation. In at least one embodiment, X can be a value in the inclusive range from 1-100. For example, in at least one embodiment, X can be 5. More generally, X can be any suitable value. In at least one embodiment, X can be a factor to account for error, variations and/or fluctuations in the average number of flushes per time interval. For example, X can be a factor having a selected value based, at least in part, on variations in expected write I/O workload such as to account for bursts of host write I/Os that subsequently result in corresponding increases in the flush rate of the recorded write I/Os from the log. In at least one embodiment, X can be selected, based at least in part, in based on a maximum flush rate expected with respect to the log and/or a number of time intervals desired to provide a buffer of additional PLBs.

D) NumPLB [(LWMAf)], where NumPLB denotes the number (e.g., count or quantity) of PLBs expected to be consumed for storing written data of recorded write operations that are flushed from the log in each single time interval based on (or determined in accordance with) an average number of flushes per time interval, such as LWMAf. Thus in at least one embodiment, NumPLB can denote an average number of PLBs, such as a moving average, expected to be consumed for storing written data of recorded write operations that are flushed from the log in each single time interval based on (or determined in accordance with) an average number of flushes per time interval, such as LWMAf. and E) CA min free PLBs denotes a minimum number of free PLBs in the system available for storing written data or content such as flushed from the log to avoid or not trigger performing compact and append (C and A) processing. In at least one embodiment, a system may perform C and A processing when the current number of free PLBs in the system available for storing written data or content such as flushed from the log is less than the threshold denoted by CA min free PLBs such as expressed in EQUATION 3.

EQUATION 4 can be generalized such as expressed in EQUATION 4A below:

GC min free PLBs=(NumPLB per time interval*X)+CA min free PLBs EQUATION 4A where:

A) GC min Free PLBs, X and CA min free PLBs are as noted above in connection with EQUATION 4; and B) "NumPLB per time interval" denotes the number (e.g., count or quantity) of PLBs expected to be consumed for storing written data of recorded write operations that are flushed from the log in each single time interval. NumPLB per time interval" can denote a PLB consumption rate of PLBs in connection with flushing entries from the log. Consistent with discussion above, "NumPLB per time interval" of EQUATION 4A is a generalization of the term "NumPLB [(LWMAf)]" from EQUATION 4. In at least one embodiment using EQUATION 4, NumPLB per time interval (e.g., the number of PLBs expected to be consumed in each single time interval) can be based on a previous history of an observed or measured flush rate of the log. For example, the observed or measured flush rate of the log can denote an average flush rate of 100 flushes per second, where the time interval is a second, denoting that 100 write I/Os as recorded in the log are flushed from the log per second. As a result of the average flush rate of flushing 100 recorded write I/Os per second from the log, an average number or quantity of PLBs is also consumed per second to store the write data written by the 100 recorded write I/Os that are flushed each second. For example, 1 PLB can be consumed for each recorded write I/O flushed from the log. As such, for a flush rate of 100 write I/Os per second, there can be 100 free PLBs of BE non-volatile storage also be consumed per second, such that "NumPLB per time interval" can be 100 PLBs.

EQUATIONS, such as EQUATION 4 and EQUATION 4A as well as others herein, can be expressed using storage units, portions or chunks that are PLBs. More generally, the techniques of the present disclosure including the EQUATIONS can use storage units, portions or chunks of any suitable size.

Figure 9A:
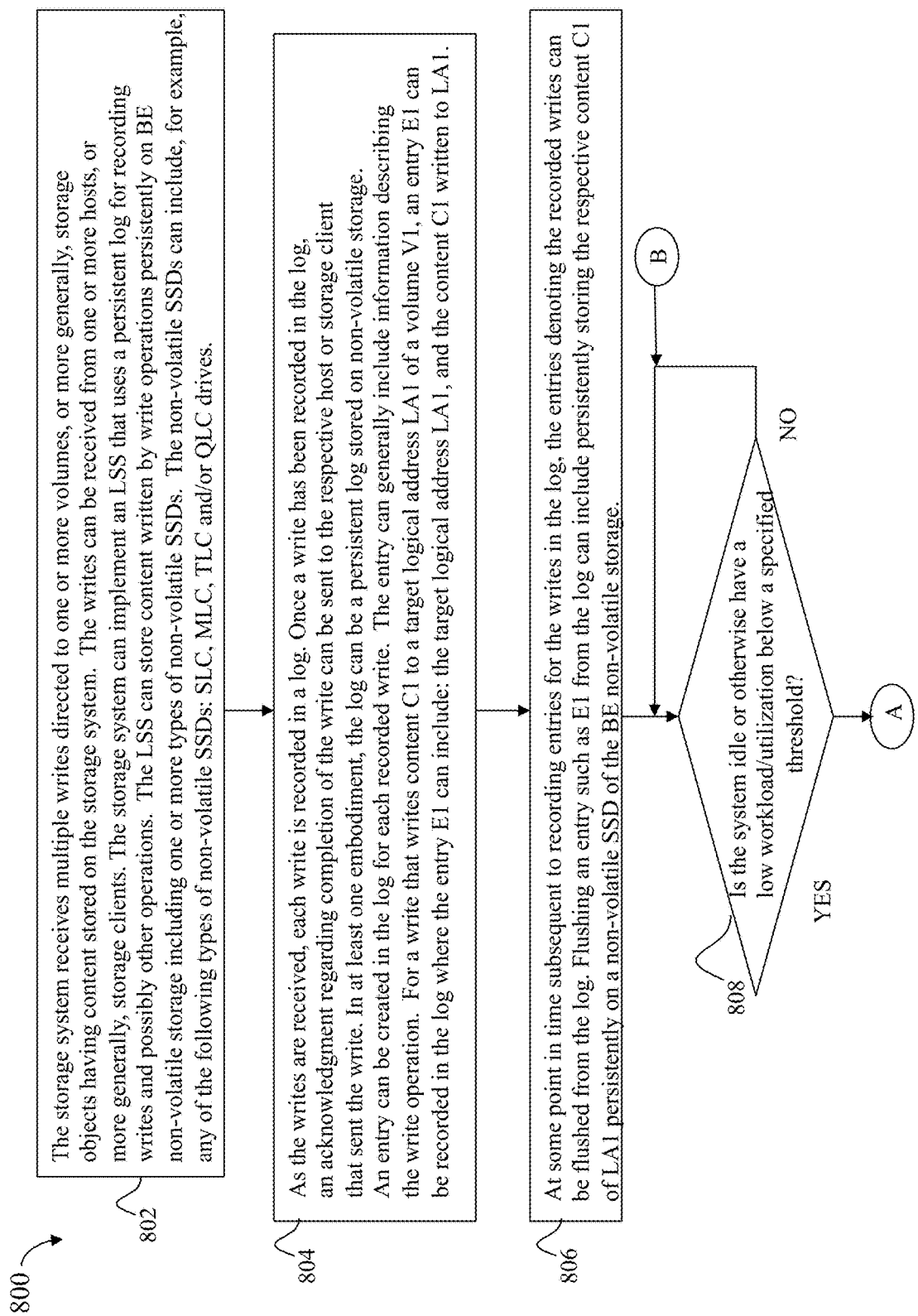
FIGS. 9A, 9B, 10 and 13 are flowcharts of processing steps that can be performed in an embodiment in accordance with the techniques of the present disclosure.
Figure 9B:
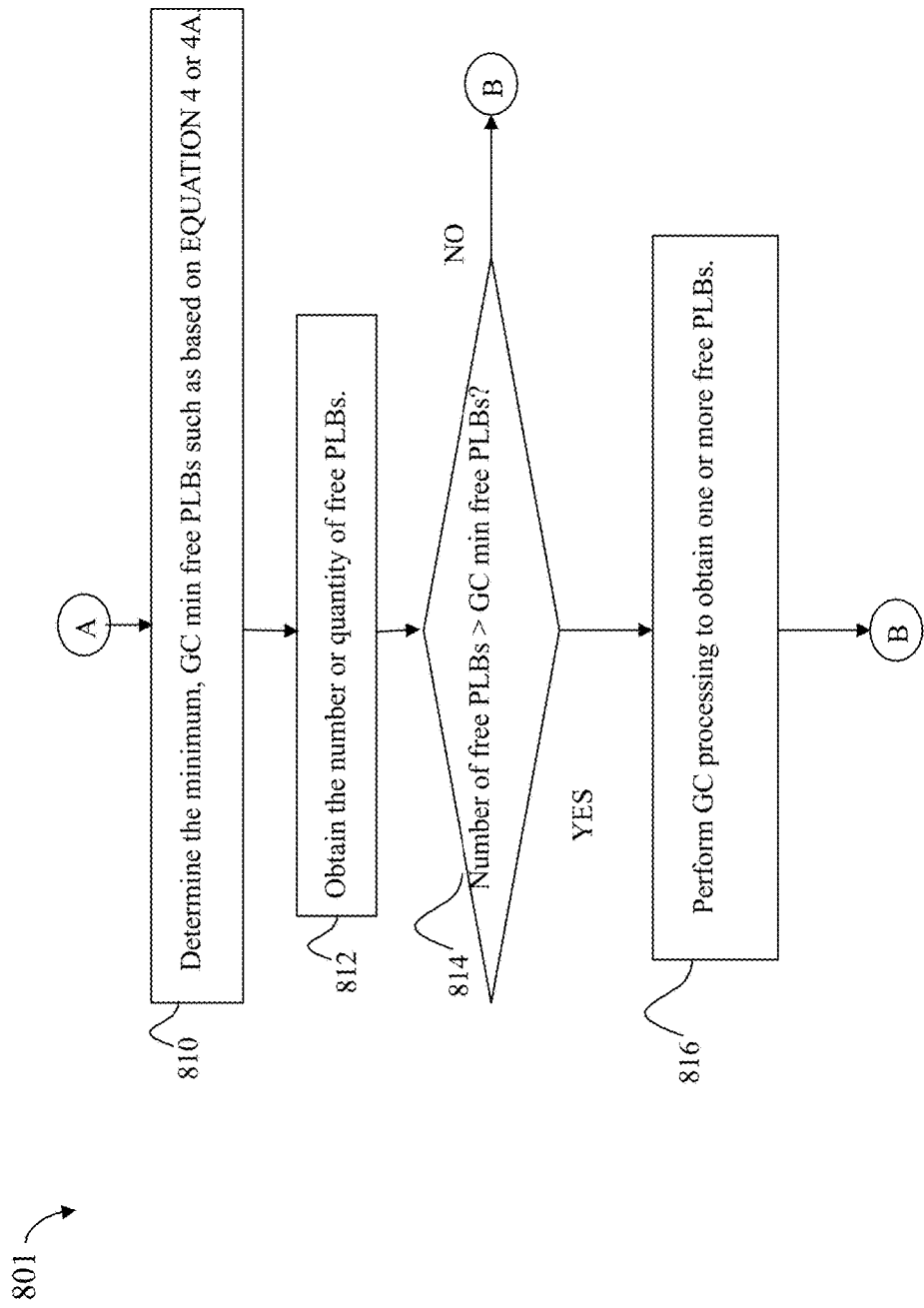
Figure 10:
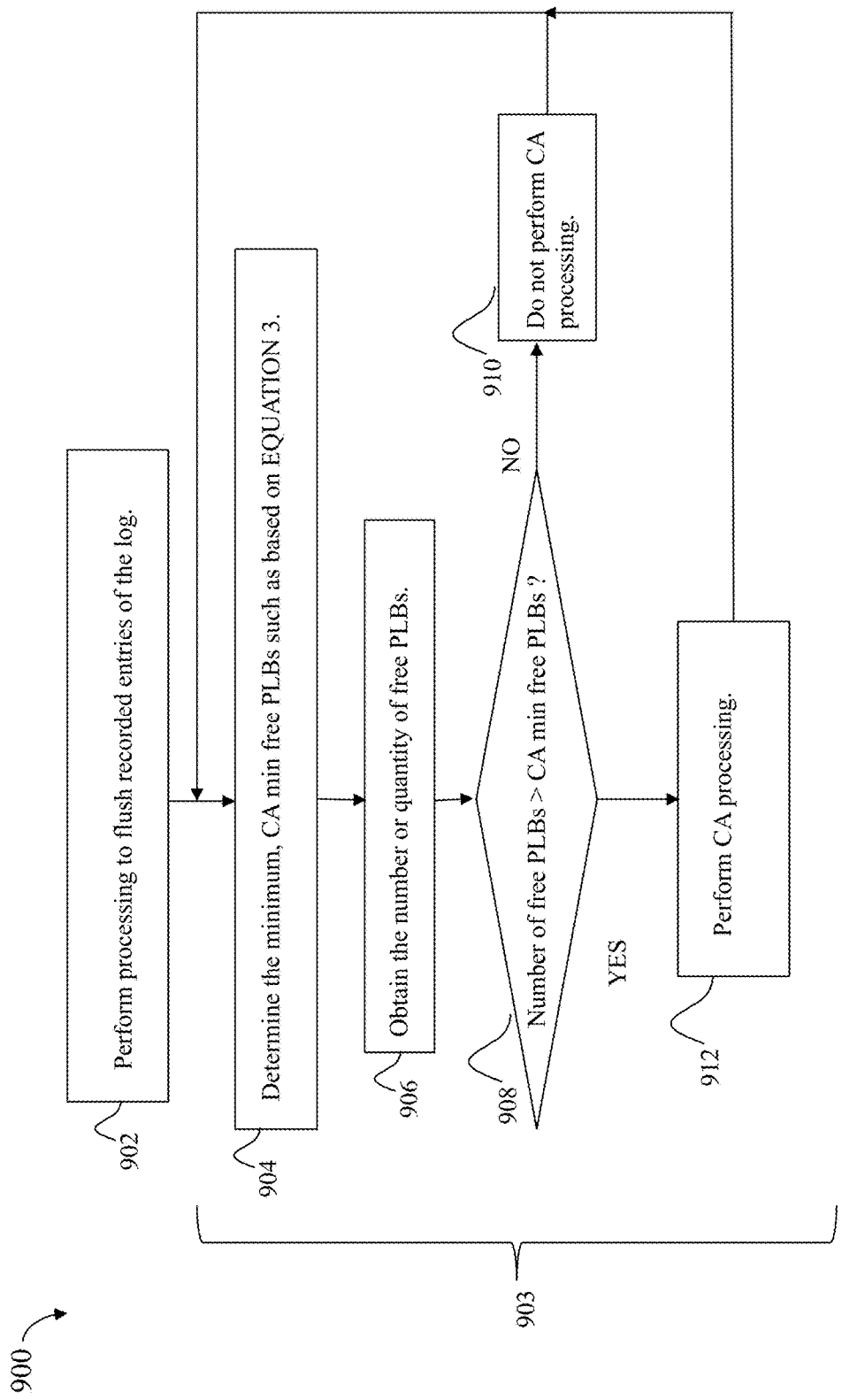

Referring to FIGS. 9A, 9B and 10, shown are flowcharts of processing steps that can be performed in at least one embodiment in accordance with the techniques of the present disclosure. FIGS. 9A, 9B and 10 summarize processing discussed above.

Referring to FIGS. 9A and 9B, shown is a flowchart 800, 801 of processing steps that can be performed in at least one embodiment in accordance with the techniques of the present disclosure.

At the step 802, the storage system receives multiple writes directed to one or more volumes, or more generally, storage objects having content stored on the storage system. The writes can be received from one or more hosts, or more generally, storage clients. The storage system can implement an LSS that uses a persistent log for recording writes and possibly other operations. The LSS can store content written by write operations persistently on BEnon-volatile storage including one or more types of non-volatile SSDs. The non-volatile SSDs can include, for example, any of the following types of non-volatile SSDs: SLC, MLC, TLC and/or QLC drives. From the step 802, control proceeds to the step 804.

At the step 804, as the writes are received, each write is recorded in a log. Once a write has been recorded in the log, an acknowledgment regarding completion of the write can be sent to the respective host or storage client that sent the write. In at least one embodiment, the log can be a persistent log stored on non-volatile storage such as NVRAM. An entry can be created in the log for each recorded write. The entry can generally include information describing the write operation. For a write that writes content C1 to a target logical address LA1 of a volume V1, an entry E1 can be recorded in the log where the entry E1 can include: the target logical address LA1, and the content C1 written to LA1. From the step 804, control proceeds to the step 806.

At the step 806, at some point in time subsequent to recording entries for the writes in the log, the entries denoting the recorded writes can be flushed from the log. Flushing an entry such as E1 from the log can include persistently storing the respective content C1 of LA1 persistently on a non-volatile SSD of the BE non-volatile storage. From the step 806, control proceeds to the step 808.

At the step 808, a determination is made as to whether the system is idle or otherwise has a low workload or utilization below a specified threshold level. If the step 808 evaluates to no or false, control remains at the step 808. If the step 808 evaluates to yes or true, control proceeds to the step 810.

At the step 810, processing can be performed to determine the minimum GC min free PLBs such as based on EQUATION 4 or 4A. From the step 810, control proceeds to the step 812.

At the step 812, the number or quantity of free PLBs, available for storing content of recorded write I/Os when flushed from the log, is determined. From the step 812, control proceeds to the step 814.

At the step 814, a determination is made as to whether the number of free PLBs is greater than the GC min free PLBs (as determined in the step 810). If the step 814 evaluates to yes, control proceeds to the step 816 to perform GC processing to obtain one or more free PLBs. From the step 816, control proceeds to the step 808. If the step 814 evaluates to no, control proceeds to the step 808.

In at least one embodiment, GC processing of the step 816 can be performed until one or more specified GC stop conditions are met or evaluate to true. For example in at least one embodiment, GC can be performed until the number of free PLBs is above the specified GC min free PLBs. As a variation, in at least one embodiment, the GC can be performed until the number of free PLBs is some second specified threshold that is above the specified GC min free PLBs.

Referring to FIG. 10, shown is a flowchart 900 of processing steps that can be performed in at least one embodiment in accordance with the techniques of the present disclosure.

At the step 902, processing can be performed to flush recorded entries of the log. The entries can include previously logged or recorded write operations. While flushing the log or during flushing of the log, subsequent steps of the flowchart 900 beginning with the step 904 (e.g., steps of 903) can be performed.

At the step 904, processing can be performed to determine the minimum CA min free PLBs such as based on EQUATION 3. From the step 904, control proceeds to the step 906.

At the step 906, the number or quantity of free PLBs, available for storing content of recorded write I/Os when flushed from the log, is determined. From the step 906, control proceeds to the step 908.

At the step 908, a determination is made as to whether the number of free PLBs is greater than the CA min free PLBs (as determined in the step 904). If the step 908 evaluates to yes or true, control proceeds to the step 912 where CA processing can be performed. In the step 912, processing can include performing compaction of valid content of a single partially filled PLB as described, for example, in connection with FIG. 8. From the step 912, control proceeds to the step 904. If the step 908 evaluates to no or false, control proceeds to the step 904.

Generally in at least one embodiment, the processing steps of 903 can be repeatedly performed during or while flushing the log. In at least one embodiment, processing can periodically and/or continually perform the evaluation of the step 904, 906 and 908 to determine whether to perform CA processing.

In at least one embodiment, compaction of the step 912 can be performed until one or more specified CA stop conditions are met or evaluate to true. For example in at least one embodiment, the compaction of partial PLBs can be performed until the number of free PLBs is above the specified CA min free PLBs. As a variation, in at least one embodiment, the compaction of partial PLBs can be performed until the number of free PLBs is some second specified threshold that is above the specified CA min free PLBs.

In at least one embodiment, CA processing can be performed during flushing when additional storage is needed when the number of free PLBs falls below the specified CA min free PLBs. Although CA processing as discussed herein does not generate net free PLBs, compaction of CA processing can be performed in order to obtain larger contiguous portions of PLB storage that are not complete free PLBs. If the number of free PLBs should fall to zero during flushing, flushing of the log can still continue by storing or appending flushed write data on one or more partially filled PLBs that have been compacted (e.g., have had their valid content stored contiguously at one end of the partially filled compacted PLB).

In at least one embodiment, CA processing can select for compaction a partial PLB having the lowest utilization of available partial PLB candidates. In at least one embodiment, CA processing can select for compaction a partial PLB having a respective utilization less than a specified threshold. Generally, it can be desirable to select partial PLBs for compaction by CA processing that have the lowest utilization of all candidates since such partial PLBs have the smallest amount of valid content to compact and move. Thus such partial PLB candidates with the least utilization and thus having the least amount of valid content incur the lowest additional writes of WA of all candidates.

What will now be described are techniques of the present disclosure that can be used in connection with selecting particular partial PLBs (e.g., PLBs partially populated with valid content intermixed among holes of invalid content) in at least one embodiment. In at least one embodiment, such techniques for selecting partial PLBs can be used in connection with selecting, ordering and/or prioritizing partial PLBs for use in connection with GC processing in efforts to reduce or minimize WA and provide for more efficient GC.

In an LSS in at least one embodiment, since written content or data is written to a new location, as logical addresses are repeatedly overwritten with new content, existing full PLBs that can have 100% utilization can eventually over time become partial PLBs having a utilization generally less than 100%. Generally, as the same logical addresses are overwritten with new content, the content of existing PLBs (that can initially have 100% utilization) can become stale or invalid thereby reducing the utilization of such PLBs. Also generally as time progresses, the utilization of such PLBs can further decrease as new content is written to more logical addresses having existing content stored on such PLBs.

In at least one embodiment in accordance with the techniques of the present disclosure and consistent with other discussion herein, GC can be deemed more if GC processing is performed using lower utilized PLBs instead of combining a high utilized PLB with a low utilized PLBs due to the natural expected progression of utilization of highly utilized PLBs. Moreover, consistent with other discussion herein such as, for example, FIG. 7, for same amount of data movement or copying, garbage collecting multiple low-utilized PLBs can generate more free PLBs, than combining a low and a highly utilized PLBs. As another example, consider comparison of other scenarios discussed elsewhere herein where in a first scenario 1, there are 2 source partial PLBs that contain a mixture of 50% valid data and 50% invalid data or holes (e.g., each PLB has a 50% utilization with the remaining 50% of the PLB containing invalid or free holes of storage). GC can be performed to consolidate the valid data in the 2 source PLBs into a single target PLB by copying the valid data from the 2 source PLBs to the target PLB. The foregoing consolidation results in a net gain of 1 free PLB by freeing the 2 source PLBs, and consuming or using the single target PLB that contains the consolidated valid data from the 2 original source PLBs. In a second scenario 2, consider 4 source PLBs each having a 25% utilization (e.g., each PLB contains 25% valid data with the remaining 75% of the PLB containing invalid or free holes of storage). In this case, GC can be performed to consolidate the valid data of the 4 source PLBs into a single target PLB by copying the valid data from the 4 source PLBs to the target PLB. The foregoing consolidation of scenario 2 results in a net gain of 3 free PLBs by freeing the 4 source PLBs, and consuming or using the single target PLB that contains the consolidated valid data from the 4 original source PLBs. In this latter scenario 2, the same amount of valid data or content is moved to the single target PLB as in the former scenario 1 (with 2 source PLBs each having 50% PLB utilization), but the latter scenario results in a net gain of 3 PLBs in comparison to a net gain of 1 PLB in the former scenario. Accordingly in at least one embodiment, selecting which partial PLBs to use as source PLBs in connection with GC can be an important factor in connection with GC efficiency and resulting corresponding WA incurred due to the additional writes performed when moving and consolidating valid content from the source PLBs to one or more target PLBs.

In at least one embodiment in accordance with the techniques of the present disclosure, GC processing can order candidate partial source PLBs based on increasing utilization and can select multiple partial PLBs having the lowest utilization of the partial PLB candidates. In at least one embodiment, the multiple partial PLB candidates can be used as source PLBs whose valid content can be combined and moved or copied to a single contiguous region at one end of one or more target PLBs. Generally, the valid content of the source PLBs can fit within the one or more target PLBs. For example, if a single PLB target is used that is 100% free, then the collective utilization of the source PLBs can be generally equal to or less than 100%. In at least one embodiment, the particular source PLBs selected can have a collective utilization that is as close to 100% as possible.

In at least one embodiment of the techniques of the present disclosure, source partial PLB candidates can be those partial PLBs having corresponding utilizations (U values) less than a specified PLB utilization threshold or U threshold. In at least one embodiment, the U threshold can be based, at least in part, on the median PLB utilization or U value with respect to all partial PLBs in the system. In at least one embodiment, the median PLB utilization can be determined with respect to all partial PLBs that can be used in storing write data written by writes as such writes are flushed from the log. In at least one embodiment, the U threshold can be equal to the median PLB utilization.

In accordance with the general definition of median, the median PLB utilization can denote the $50^{th}$ percentile with respect to PLB utilization values of the PLB population of partial PLBs. The median of the PLB utilization values of the PLB population under consideration can be determined by arranging all PLB utilization values of all partial PLBs in order, such as from lowest to highest values, and determining the median as the middle value (e.g., the median of $\{2, 2, 5, 11, 12\}$ is 5). In scenarios where there are an even number of values, then there is no single middle value and the median may be alternately defined. For example in at least one embodiment in which there are an even number of values and thus no single middle or median value, the median can be defined as the mean or average of the two middle values. The point or boundary of the median is the particular value partitioning the data set (e.g., ordered list of PLB utilization values) into two equal halves (or approximately equal halves such as within a specified tolerance or amount). Thus in at least one embodiment, the median of a data set, such as a set of PLB utilization values, is the particular value of the ordered data set that partitions the data set in half such that 50% of the values or members of the data set are less than the median value and 50% of the values or members of the data set are greater than the median value. For example in at least one embodiment, if the median PLB utilization is 60%, then the U threshold can be 60% such that candidate PLBs from which particular PLBs can be selected as source PLBs for GC can be those partial PLBs having a utilization or U that is less than the population median value of 60%.

In at least one embodiment having a U threshold of the median PLB utilization of the partial PLB population, the pool of PLB candidates available for selection as source PLBs for GC constitute half of the partial PLBs available in the system. In at least one embodiment, the expected size or number of partial PLB candidates can be a sufficient number from which to select source partial PLBs for use in GC processing. Additionally, having candidates with a PLB utilization less than the median PLB utilization also provides for efficient GC processing.

As a variation in at least one embodiment, the U threshold can be equal to the median PLB utilization plus an additional XX % more than the median PLB utilization. The XX % can generally denote an additional PLB utilization amount greater than the median PLB utilization. For example in at least one embodiment, if the median PLB utilization is 60% and XX is 5, then the U threshold can be 65% (e.g., median 60% plus the additional XX % of 5%) such that candidate PLBs from which particular PLBs can be selected as source PLBs for GC can be those partial PLBs having a utilization or U that is less than 65%.

In this manner in at least one embodiment, the techniques of the present disclosure can specify the candidate pool of partial PLBs available for use or selection as a source partial PLB for GC processing based, at least in part, on the median PLB utilization of all partial PLBs available in the system.

In at least one embodiment, once the candidate pool of partial PLBs for GC processing is identified, GC processing can include selecting multiple partial PLBs from the pool such that there collective valid content can be moved or copied to one or more free target PLBs. In at least one embodiment where there is a single target PLBs, multiple partial PLBs can be selected having a collective utilization that is generally equal to or less than 100% and/or as close to 100% as possible. Generally in at least one embodiment, the multiple source partial PLBs selected have a collective combined set of valid content that can be stored within the N target free PLBs, where N is greater than 0. Generally in at least one embodiment, the multiple source partial PLBs selected have a collective combined utilization that is generally equal to or less than N*100% and/or as close to N*100% as possible.

In at least one embodiment, GC processing can select candidate partial PLBs for combining valid content thereof to one or more target free PLBs as those candidates having the lowest or least PLB utilization. In this manner, partial PLB candidates can be ordered or sorted based in increasing respective PLB utilizations where GC processing can then select partial PLBs based on the increasing PLB utilization order. For example, consider a candidate pool of 20 partial PLBs where 10 PLBs each have 10% PLB utilization, and where the remaining 10 PLBs each have 20% PLB utilization. First GC processing can select a first set of the 10 PLBs with 10% PLB utilization as source PLBs where the valid content of the PLBs of the first set can be moved to a single free target PLB having a 100% utilization after the first GC processing. As a result of the first GC processing, 10 free PLBs can be generated. Subsequently after first GC processing, the candidate pool now includes 10 partial PLBs each with 20% PLB utilization. At this point, second GC processing can be performed to select a second set of 5 PLBs each with 20% PLB utilization as source PLBs where the valid content of the 5 PLBs of the second set can be moved to a single target free PLB having a 100% utilization after the second GC processing. As a result of the second GC processing, 5 free PLBs can be generated.

In at least one embodiment, GC processing can select candidate partial PLBs for combining valid content thereof to one or more target free PLBs based, at least in part, on the collective utilization of the source PLBs. In at least one embodiment, the pool of candidate partial PLBs can include those with a utilization that is less than a U threshold, where the U threshold is based, at least in part, on the median PLB utilization of all partial PLBs. For example, assume the median PLB utilization is 70% such that the pool of partial PLB candidates includes those with a PLB utilization less than 70%. GC processing can consider a number of target free PLBs, such as 1 target free PLB, and can evaluate multiple sets of partial PLB candidates. For example, GC processing can evaluate a first set of 2 PLB candidates where one PLB has a utilization of 10% and a second PLB has a utilization of 60% for a collective utilization of 70%; and second set of 2 PLB candidates each having a utilization of 50% for a collective utilization of 100%. In this case, GC processing may select to the set second for which to perform GC processing since the second set has a respective collective utilization that is closest to or equal to 100% denoting full utilization of the single target PLB. As a variation, an embodiment can choose to perform GC processing for both the foregoing two sets of partial PLBs depending on the number of free PLBs that may need to be generated as a result of GC processing.

In at least one embodiment, GC processing can select partial PLB candidates based on the sorted increased ordering of respective PLB utilizations. In at least one embodiment, GC processing can proceed to combine the next set of two or more partial PLBs having a collective combined utilization that is less than or equal to N*100%, where N denotes the number of target PLBs and N is an integer greater than 0.

In at least one embodiment, CA processing can select for compaction a partial PLB having the lowest utilization of available partial PLB candidates, where such candidates can be determined as noted above as those partial PLBs having corresponding utilizations less than a specified PLB utilization threshold. In at least one embodiment, the PLB utilization threshold can be based, at least in part, on the median PLB utilization. For example, the PLB utilization threshold can be the median PLB utilization, or can be the median PLB utilization plus some additional XX %. In at least one embodiment, CA processing can select for compaction a partial PLB having a respective utilization less than the specified threshold. Generally, it can be desirable to select partial PLBs for compaction by CA processing that have the lowest utilization of all candidates since such partial PLBs have the smallest amount of valid content to compact and move. Thus such partial PLB candidates with the least utilization and thus having the least amount of valid content incur the lowest additional writes of WA of all candidates.

Figure 11:
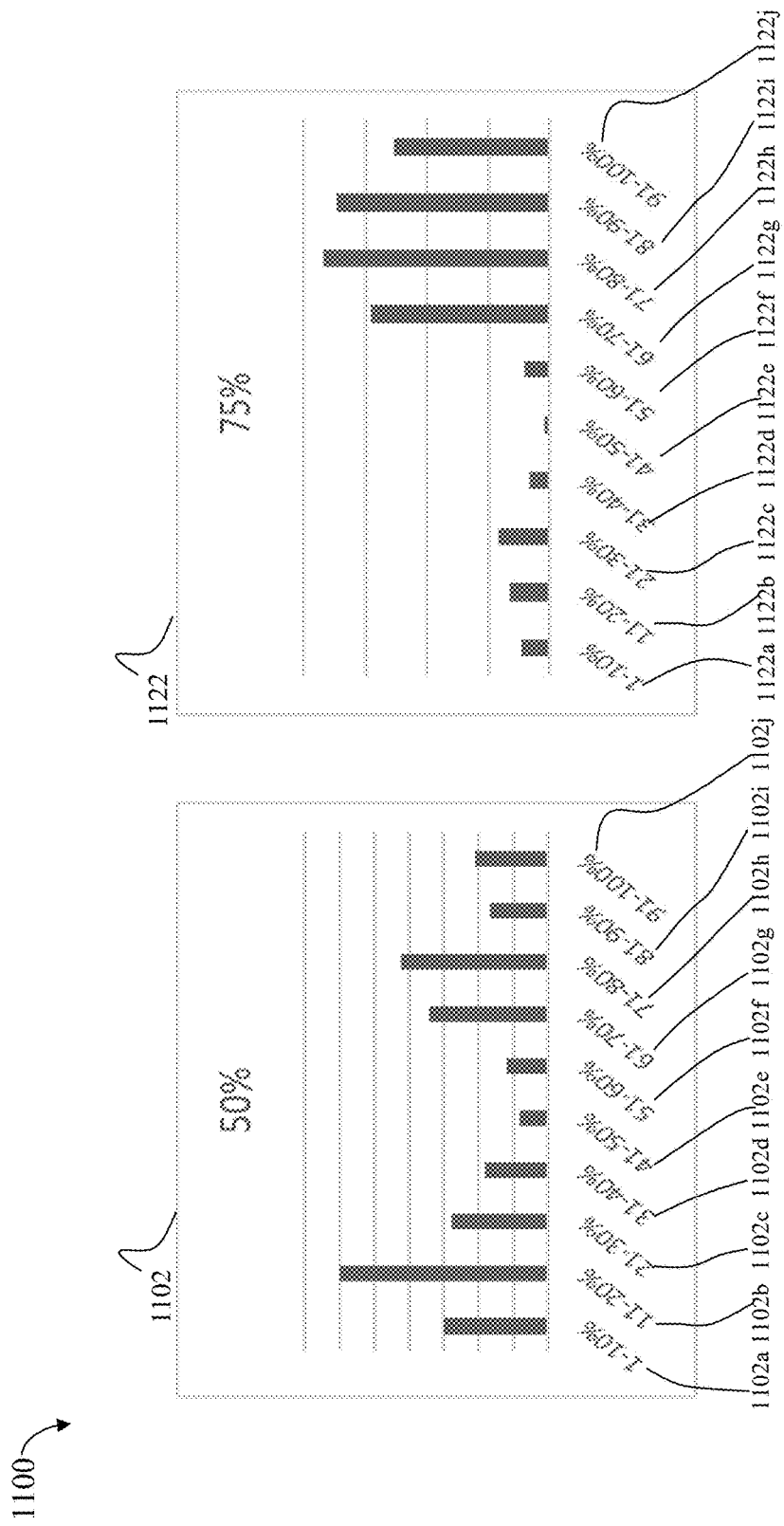
FIG. 11 includes graphs illustrating PLB utilization distributions in at least one embodiment in accordance with the techniques of the present disclosure.

Referring to FIG. 11, shown is an example 1100 of PLB utilization distributions in at least one embodiment in accordance with the techniques of the present disclosure.

The example 1100 includes a first graph 1102 illustrating a distribution of PLB utilizations in a system, where the PLBs denote storage of non-volatile SSDs used as BE storage for storing content written by writes flushed from the log, and where such non-volatile SSDs have a corresponding overall storage utilization or consumption of 50%. Put another way, the graph 1102 denotes a PLB utilization distribution with respect to BE non-volatile storage of SSDs where 50% of the total storage capacity of the SSDs in the system is consumed. The first graph 1102 has an X axis with defined PLB utilization buckets 1102a-j that are each 10% in size; and a Y axis denoting a count or quantity of PLBs falling into each of the buckets of the X axis.

In at least one embodiment, a median utilization bucket can be determined that includes the median of the PLB utilization values. For illustration, assume that the median PLB utilization bucket of the graph 1102 is the 51-60% bucket 1102f such that the median PLB utilization is within the bucket range of 51-60%. In at least one embodiment, the candidate pool of partial PLBs can be those with a PLB utilization falling into median utilization bucket 1102f or a lower utilization bucket. In connection with the median PLB utilization bucket being the bucket 1102f with the corresponding range 51%-60%, the candidate pool of partial PLBs can be those with a PLB utilization that is equal to or less than 60%. In such an embodiment, the candidates of source partial PLBs for GC processing can have a PLB utilization that is equal to or less than 60% (e.g., those partial PLBs of the buckets 1102a-f).

In at least one embodiment, a median utilization bucket, Bmed can be determined such that a first sum or quantity of PLB utilization percentages of all buckets having associated ranges less than Bmed's range is equal to, or approximately equal to (e.g., within some specified tolerance) a second sum or quantity of PLB utilization percentages of all buckets having associated ranges above Bmed's range. For example with reference to the graph 1102, the median PLB utilization bucket of the graph 1102 can be the 51-60% bucket 1102*f* such that the first total quantity or number of PLB utilizations across the buckets 1102*a-e* is equal to, or approximately equal to, the second total quantity or number of PLB utilizations across the buckets 1102*g-j*. In at least one embodiment, the candidate pool of partial PLBs can be those with a PLB utilization falling into median utilization bucket 1102*f* or a lower utilization bucket 1202*a-e*. In connection with Bmed being 1102*f*, the candidate pool of partial PLBs can be those with a PLB utilization that is equal to or less than 60%. In such an embodiment, the candidates of source partial PLBs for GC processing can have a PLB utilization that is equal to or less than 60% (e.g., those partial PLBs of the buckets 1102*a-f*).

The example 1100 includes a second graph 1122 illustrating a distribution of PLB utilizations in a system, where the PLBs denote storage of non-volatile SSDs used as BE storage for storing content written by writes flushed from the log, and where such non-volatile SSDs have a corresponding overall storage utilization or consumption of 75%. Put another way, the graph 1122 denotes a PLB utilization distribution with respect to BE non-volatile storage of SSDs where 75% of the total storage capacity of the SSDs in the system is consumed. The graph 1122 has an X axis with defined PLB utilization buckets 1122*a-j* that are each 10% in size; and a Y axis denoting a count or quantity of PLBs falling into each of the buckets of the X axis.

In at least one embodiment, a median utilization bucket can be determined that includes the median of the PLB utilization values. For illustration, assume that the median PLB utilization bucket of the graph 1122 is the 71-80% bucket 1122*h* such that the median PLB utilization is within the bucket range of 71-80%. In at least one embodiment, the candidate pool of partial PLBs can be those with a PLB utilization falling into median utilization bucket 1122*h* or a lower utilization bucket. In connection with the median PLB utilization bucket being the bucket 1122*h* with the corresponding range 71-80%, the candidate pool of partial PLBs can be those with a PLB utilization that is equal to or less than 80%. In such an embodiment, the candidates of source partial PLBs for GC processing can have a PLB utilization that is equal to or less than 80% (e.g., those partial PLBs of the buckets 1122*a-h*).

In at least one embodiment, a median utilization bucket, Bmed can be determined such that a first sum or quantity of PLB utilization percentages of all buckets having associated ranges less than Bmed's range is equal to, or approximately equal to (e.g., within some specified tolerance) a second sum or quantity of PLB utilization percentages of all buckets having associated ranges above Bmed's range. For example with reference to the graph 1122, the median PLB utilization bucket of the graph 1102 can be the 71-80% bucket 1122*h* such that the first total quantity or number of PLB utilizations across the buckets 1122*a-h* is equal to, or approximately equal to, the second total quantity or number of PLB utilizations across the buckets 1122*i-j*. In at least one embodiment, the candidate pool of partial PLBs can be those with a PLB utilization falling into median utilization bucket 1122*h* or a lower utilization bucket 1122*a-g*. In connection with Bmed being 1122*h*, the candidate pool of partial PLBs can be those with a PLB utilization that is equal to or less than 80%. In such an embodiment, the candidates of source partial PLBs for GC processing can have a PLB utilization that is equal to or less than 80% (e.g., those partial PLBs of the buckets 1122*a-h*).

Generally in at least one embodiment, as the overall system utilization denoting the percentage or amount of the total BE non-volatile storage of SSDs increases, the average partial PLB utilization also generally increases. As the average partial PLB utilization increases, the cost associated with GC also increases. In some cases, the partial PLB utilizations can increase such that only highly utilized partial PLBs are available in the system for use as GC candidates. In some cases, the candidates available for GC may only include highly utilized partial PLBs such that GC processing may be unable to produce a single net free PLB with a single iteration or cycle of data movement from the source PLBs to the target PLB. For example, in at least one embodiment, such highly utilized partial PLBs can be characterized as those having a PLB utilization (U value) that is greater than 50%. In such scenarios where the partial PLB candidates for GC only include PLBs with a PLB utilization that is greater than 50%, valid content of two or more source partial PLBs cannot be combined into a single free target PLB to generate a net free PLB with a single iteration or cycle of data movement from the source PLBs to the target PLB (e.g., the sum or collective utilization of two partial source PLBs always exceeds 100%, where 100% corresponds to the utilization of a single free PLB). As a result of the foregoing with only partial PLB candidates having utilization above 50% (or more generally where GC is unable to produce a single net free PLB with a single iteration or cycle of data movement from the source PLBs to the target PLB), in at least one embodiment partial PLB defragmentation can alternatively be performed in order to generate a single net free PLB. Generally, partial PLB defragmentation can be defined as performing two or more iterations or cycles of data movement from source to target PLBs in order to generate a single free PLB. Thus in scenarios where the candidate pool of source partial PLBs for GC only includes partial PLBs with a utilization exceeding 50%, partial PLB defragmentation can be performed to generate a single net free PLB by performing two or more iterations or cycles of data movements from source to target PLBs. More generally, in scenarios where GC processing is unable to generate at least a single net free PLB with a single cycle or iteration of data movement from source to target PLBs, partial PLB defragmentation can be performed to generate a single net free PLB by performing two or more iterations or cycles of data movements from source to target PLBs.

Figure 12A:
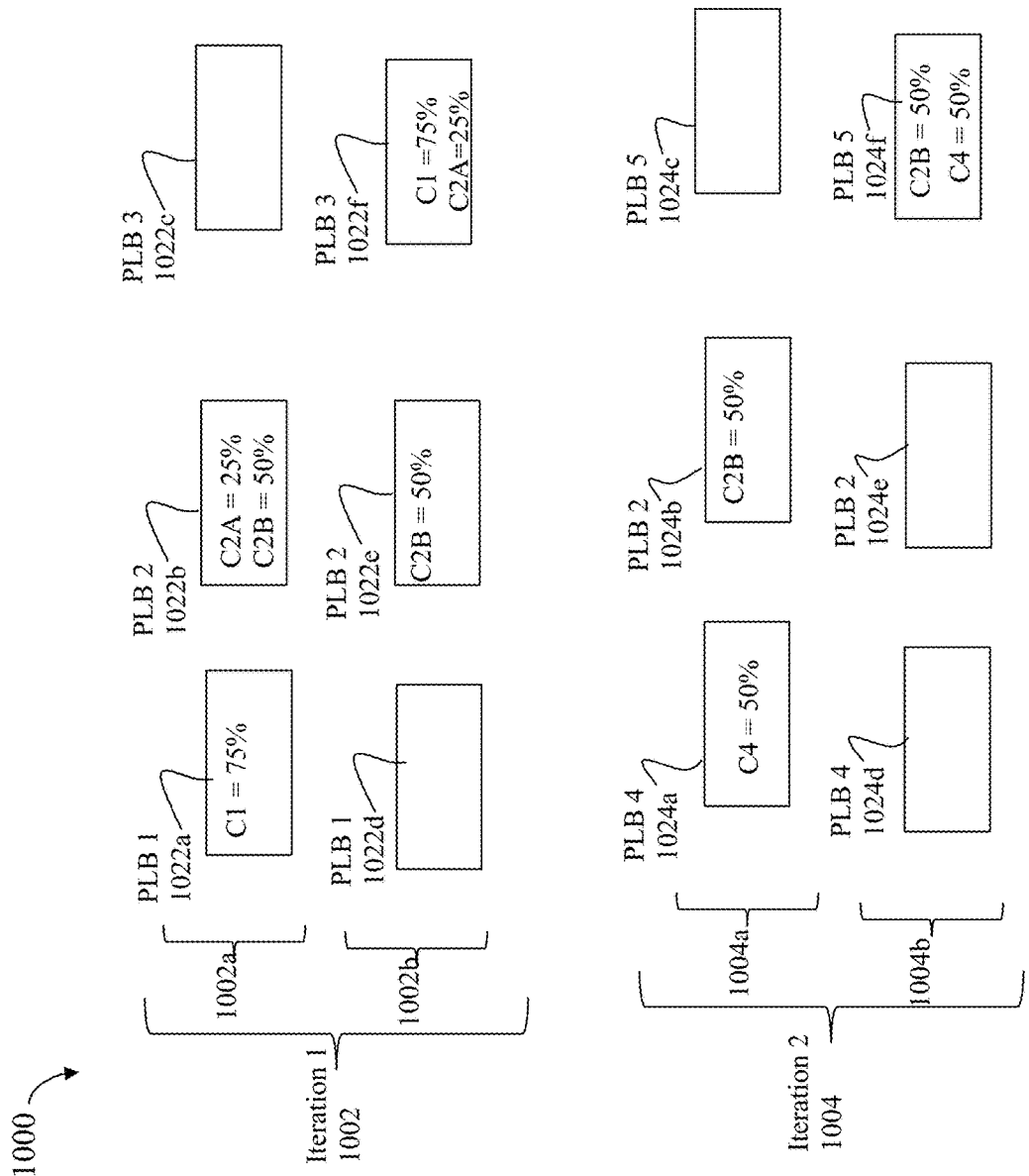
FIGS. 12A and 12B are examples illustrating PLB defragmentation that can be performed in at least one embodiment in accordance with the techniques herein.

Referring to FIG. 12A, shown is an example 1000 illustrating partial PLB defragmentation in at least one embodiment in accordance with the techniques of the present disclosure.

Element 1002 illustrates a first iteration or cycle of data movement from source to target PLBs, and element 1004 illustrates a second iteration or cycle of data movement from source to target PLBs. As a result of performing the first iteration 1002 and then the second iteration 1004, 1 net free PLB is generated.

In connection with iteration 1 1002, PLB 1 1022*a* and PLB 2 1022*b* can be the source partial PLBs and PLB 3 1022*c* can be the free target PLB. Element 1002*a* denotes the valid content and state of the PLBs before the data movement, and element 1002*b* denotes the valid content and state of the PLBs after the data movement of iteration 1. PLB 1

1022*a* has a utilization of 75% and includes valid content C1 occupying 75% of the PLB 1 1022*a*. PLB 2 1022*b* has a utilization of 75% and includes valid content occupying 75% of the PLB 2 1022*b*. The valid content of PLB 2 1022*b* is illustrated as having two portions: C2A denoting 25% of the valid content, and C2B denoting the remaining 50% of the valid content. The data movement of iteration 1 1002 can include combining and copying the valid content C1 (75%) of PLB 1 1022*a* and the valid content C2A (25% of PLB 2 1022*b*) to the target PLB 3 1022*c*.

Element 1002*b* shows the resulting state of valid content and utilization on the source and target PLBs after the foregoing data movement from the source PLBs 1022*a*, 1022*b* to the target PLB 1022*c*. As a result of the data movement of iteration 1: PLB 1 is free as denoted by 1022*d*; PLB2's utilization is now reduced to 50% and contains the valid content C2B (as denoted by 1022*e*); and PLB3's utilization is now 100% due to the movement and copying of data portions C1 and C2A, respectively, from PLB 1 and PLB 2, to the target PLB 3. Thus as a result of the first data movement iteration or cycle 1002, there is a free PLB, PLB 1 1022*d*, and the utilization of PLB2 has been reduced from 75% to 50% as denoted by 1022*e*.

In connection with iteration 2 1004, PLB 4 1024*a* and PLB 2 1024*b* can be the source partial PLBs and PLB 5 1024*c* can be the free target PLB. Element 1024*b* denotes the same state of PLB2 as 1022*e* from iteration 1. Element 1004*a* denotes the valid content and state of the PLBs before the data movement, and element 1004*b* denotes the valid content and state of the PLBs after the data movement of iteration 2. PLB 4 1024*a* has a utilization of 50% and includes valid content C4 occupying 50% of the PLB 4 1024*a*. PLB 2 1024*b* has a utilization of 50% and includes valid content C2B occupying 50% of the PLB 2 1024*b*. The data movement of iteration 2 1004 can include combining and copying the valid content C4 (50%) of PLB 4 1024*a* and the valid content C2B (50% of PLB 2 1024*b*) to the target PLB 5 1024*c*.

Element 1004*b* shows the resulting state of valid content and utilization on the source and target PLBs after the foregoing data movement from the source PLBs 1024*a*, 1024*b* to the target PLB 1024*c*. As a result of the data movement of iteration 2: PLB 4 is free as denoted by 1024*d*; PLB2's utilization is now reduced to 0% and denotes a free PLB (as denoted by element 1024*e*); and as illustrated by element 1024*e*, PLB5's utilization is now 100% due to the movement and copying of data portions C2B and C4, respectively, from PLB 4 and PLB 2, to the target PLB 5. Thus as a result of the second data movement iteration or cycle 1004, there are two free PLBs: PLB 4 1024*d* and PLB 2 1024*e*. As a result of iteration 2 1004 of data movement, 1 net free PLB is generated. More generally, as a result of iteration or cycles 1002, 1004, one net free PLB is generated.

Figure 12B:
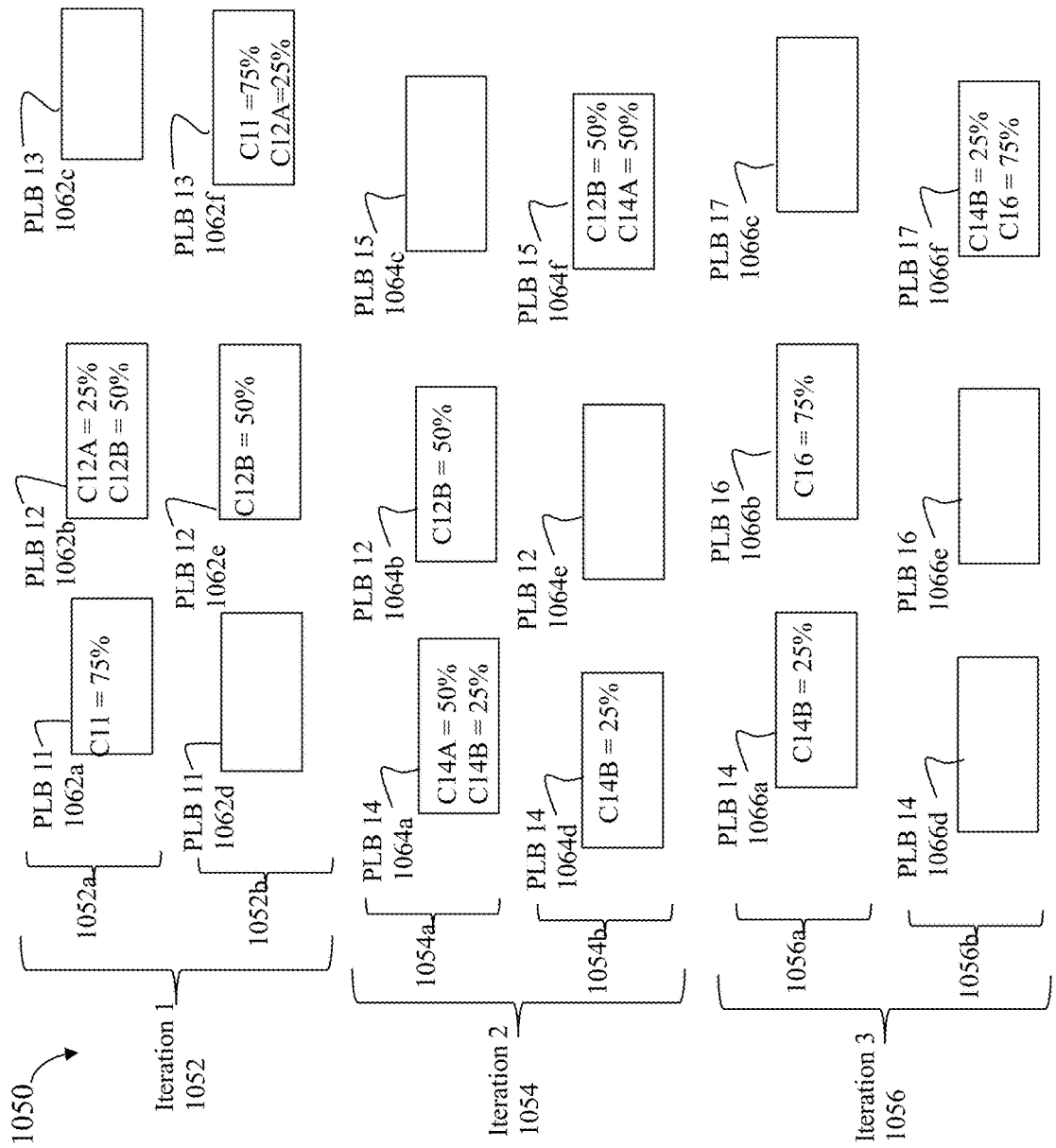

Referring to FIG. 12B, shown is another example 1050 illustrating partial PLB defragmentation in at least one embodiment in accordance with the techniques of the present disclosure.

Element 1052 illustrates a first iteration or cycle of data movement from source to target PLBs; element 1054 illustrates a second iteration or cycle of data movement from source to target PLBs; and element 1056 illustrates a third cycle or iteration of data movement from source to target PLBs. As a result of performing in sequence the first iteration 1052, the second iteration 1054, and the third iteration 1056, 1 net free PLB is generated.

In connection with iteration 1 1052, PLB 11 1062*a* and PLB 12 1062*b* can be the source partial PLBs and PLB 13 1062*c* can be the free target PLB. Element 1052*a* denotes the valid content and state of the PLBs before the data movement, and element 1052*b* denotes the valid content and state of the PLBs after the data movement of iteration 1 1052. PLB 1 1062*a* has a utilization of 75% and includes valid content C11 occupying 75% of the PLB 11 1062*a*. PLB 12 1062*b* has a utilization of 75% and includes valid content occupying 75% of the PLB 12 1026*b*. The valid content of PLB 12 1062*b* is illustrated as having two portions: C12A denoting 25% of the valid content, and C12B denoting the remaining 50% of the valid content. The data movement of iteration 1 1052 can include combining and copying the valid content C11 (75%) of PLB 11 1062*a* and the valid content C12A (25% of PLB 12 1062*b*) to the target PLB 13 1062*c*.

Element 1052*b* shows the resulting state of valid content and utilization on the source and target PLBs after the foregoing data movement from the source PLBs 1062*a*, 1062*b* to the target PLB 1062*c*. As a result of the data movement of iteration 1 1052: PLB 11 is free as denoted by 1062*d*; PLB12's utilization is now reduced to 50% and contains the valid content C12B (as denoted by 1062*e*); and PLB13's utilization is now 100% due to the movement and copying of data portions C11 and 1C2A, respectively, from PLB 11 and PLB 12, to the target PLB 13. Thus as a result of the first data movement iteration or cycle 1052, there is a free PLB, PLB 11 1062*d*, and the utilization of PLB12 has been reduced from 75% to 50% as denoted by 1062*e*.

In connection with iteration 2 1054, PLB 14 1064*a* and PLB 12 1064*b* can be the source partial PLBs and PLB 15 1064*c* can be the free target PLB. Element 1064*b* denotes the same state of PLB12 as 1062*e* from iteration 1. Element 1054*a* denotes the valid content and state of the PLBs before the data movement, and element 1054*b* denotes the valid content and state of the PLBs after the data movement of iteration 2 1054. PLB 14 1064*a* has a utilization of 75% and includes valid content occupying 75% of PLB 14. The valid content of PLB 14 1064*a* is illustrated as having two portions: C14A denoting 50% of the valid content, and C14B denoting the remaining 25% of the valid content. PLB 12 1064*b* has a utilization of 50% and includes valid content C12B occupying 50% of the PLB 12 1064*b*. The data movement of iteration 2 1054 can include combining and copying the valid content C14A (50%) of PLB 14 1064*a* and the valid content C12B (50% of PLB 12 1064*b*) to the target PLB 15 1064*c*.

Element 1054*b* shows the resulting state of valid content and utilization on the source and target PLBs after the foregoing data movement from the source PLBs 1064*a*, 1064*b* to the target PLB 1064*c*. As a result of the data movement of iteration 2 1054: PLB 14's utilization is now reduced to 25% and includes the valid content C14B (as illustrated by 1064*d*); PLB12; s utilization is now 0% denoting a free PLB (as illustrated by 1064*e*); and PLB15's utilization is now 100% due to the movement and copying of data portions C12B and C14, respectively, from PLB 14 and PLB 12, to the target PLB 15 (as illustrated by 1064*f*). Thus as a result of the second data movement iteration or cycle 1054: PLB 14's utilization has been reduced from 75% (1064*a*) to 25% (1064*d*); PLB 12 is free (1064*e*); and PLB 15 is fully utilized (1064*f*).

In connection with iteration 3 1056, PLB 14 1066*a* and PLB 16 1066*b* can be the source partial PLBs and PLB 17 1066*c* can be the free target PLB. Element 1066*a* denotes the same state of PLB14 as 1064*d* from iteration 2 1054.

Element 1056*a* denotes the valid content and state of the PLBs before the data movement, and element 1056*b* denotes the valid content and state of the PLBs after the data movement of iteration 3 1056. PLB 14 1066*a* has a utilization of 25% and includes valid content C14B occupying 25% of the PLB 14 1066*a*. PLB 16 1066*b* has a utilization of 75% and includes valid content C16 occupying 75% of the PLB 16 1066*b*. PLB 1066*c* is a free PLB with utilization of 0%. The data movement of iteration 3 1056 can include combining and copying the valid content C14B (25%) of PLB 41 1066*d* and the valid content C16 (75% of PLB 16 1066*b* to the target PLB 17 1066*c*.

Element 1056*b* shows the resulting state of valid content and utilization on the source and target PLBs after the foregoing data movement from the source PLBs 1066*a-b* to the target PLB 1066*c*. As a result of the data movement of iteration 3 1056: PLB 14 is free as denoted by 1066*d*; PLB 16 is free as denoted by 1066*e*; and as illustrated by element 1066*f*, PLB 17's utilization is now 100% due to the movement and copying of data portions C14B and C16, respectively, from PLB 14 and PLB 16, to the target PLB 17. Thus as a result of the third data movement iteration or cycle 1056, there are two free PLBs: PLB 14 1066*d* and PLB 16 106*e*. As a result of iteration 3 1056 of data movement, 1 net free PLB is generated. More generally, as a result of iteration or cycles 1052, 1054 and 1056, one net free PLB is generated.

Generally, as illustrated in FIG. 12B, the utilization of PLB 12 can be reduced by iteration 1 1052 to 50% so that PLB 12's valid content can be combined with another source partial PLB 14 in the next iteration 2 1054. In a similar manner, the utilization of PLB 14 can be reduced by iteration 2 1054 from 75% to 25% so that PLB 14's valid content can be combined with another source partial PLB 16 in the next iteration 3 1056. In a similar manner, additional iterations can be performed to reduce a particular PLB's utilization and where the PLB with the reduced utilization can then be combined (completely or partially) with another source partial PLB.

In at least one embodiment, partial PLB defragmentation can include selecting two partial PLBs, PLB Y1 and PLB Y2, as sources where the valid content of PLB Y1 is combined with a portion of the valid content of PLB Y2, and where the combined valid content of PLBs Y1 and Y2 is moved to a target PLB Y3 to maximize the utilization of Y3. The valid content portion of PLB Y2 can be less than all the valid content of the PLB Y2 such that after the foregoing data movement, the utilization of PLB Y2 is lowered but is not zero. In a next iteration, PLB Y2 (whose utilization was lowered by the prior iteration) is selected as a partial source PLB, where the remaining valid content of PLB Y2 can be combined (completely or partially) with another partial PLB. Additional one or more iterations can be performed as needed to generally reduce the utilization of one PLB that is then used as a source PLB in a next iteration, until a net free PLB is generated.

Consistent with other discussion herein in at least one embodiment, the source partial PLBs used in connection with partial PLB defragmentation can include valid content interspersed among holes of invalid content or unused storage portions of the PLB.

Thus generally in at least one embodiment, when there are idle cycles or cycles of low workload, if GC processing is unable to generate at least one net free PLB as a result of a single cycle or iteration of data movement from multiple source PLBs to one or more target PLBs, then partial PLB defragmentation can be performed. Partial PLB defragmentation can include performing two or more cycles or iterations of data movement from multiple source PLBs to one or more target PLBs to generate a net free PLB. Generally, GC can generate a single net free PLB with a single cycle or iteration of data movement; and partial PLB defragmentation can generated a single net free PLB by performing multiple iterations of data movement to generate a single net free PLB. As a result to obtain a single net or additional free PLB, additional WA is incurred when a system performs partial PLB defragmentation in comparison to GC processing.

In at least one embodiment in accordance with the techniques of the present disclosure, processing can evaluate multiple conditions denoting the state of the system in order to selectively decide whether partial PLB defragmentation is to be performed so as to incur the associated WA in scenarios when GC processing is unable to generate a net free PLB with a single iteration or cycle of data movement.

In at least one embodiment, if a system:
- a1) is idle or has a current workload below a specified threshold;
- b1) has only highly utilized PLBs and therefore is unable to generate a single net free PLB with a single iteration or cycle of data movement (as performed by GC);
- c1) has a current number of free PLBs below a specified first threshold, such as the threshold "minimum GC min free PLBs" such as based on EQUATION 4 or 4A; and
- d1) has a current number of free PLBs above a specified second threshold, such as the "CA min free PLBs" such as based on EQUATION 3 (where the specified second threshold is less than the specified first threshold of 3);

then processing can determine not to perform partial PLB defragmentation.

In at least one embodiment, if a system:
- a2) is idle or has a current workload below a specified threshold;
- b2) has only highly utilized PLBs and therefore is unable to generate a single net free PLB with a single iteration or cycle of data movement (as performed by GC);
- c2) has a current number of free PLBs below the specified first threshold, such as the threshold "minimum GC min free PLBs" such as based on EQUATION 4 or 4A; and
- d2) has a current number of free PLBs that is equal to or less than the specified second threshold, such as the "CA min free PLBs" such as based on EQUATION 3 (where the specified second threshold is less than the specified first threshold of 3);

then processing can determine to perform partial PLB defragmentation.

As a variation in connection with c2) in at least one embodiment, c2) can be alternatively replaced with c3) has a current number of free PLBs that is below a third threshold, where the third threshold is determined as a specified amount above the threshold "minimum GC min free PLBs" such as based on EQUATION 4 or 4A. Thus, the third threshold can be based, at least in part, on the threshold "minimum GC min free PLBs" such as based on EQUATION 4 or 4A.

During periods of idle or low workload where the current number of free PLBs can be characterized as very low, such as lower than the second and/or third thresholds noted above, a determination can be made to perform partial PLB defragmentation. If partial PLB defragmentation is not performed when the level of free PLBs in the system is very low, the very low level of free PLBs may trigger CA processing during flushing and can result in adversely impacting performance. Thus in at least one embodiment when the level of free PLBs is very low, partial PLB defragmentation can be performed during idle periods or periods of low workload rather CA processing during flushing. In one aspect, the foregoing choice of either performing partial PLB defragmentation or CA processing can be characterized, respectively, as a tradeoff between drive wear and performance in at least one embodiment.

Figure 13:
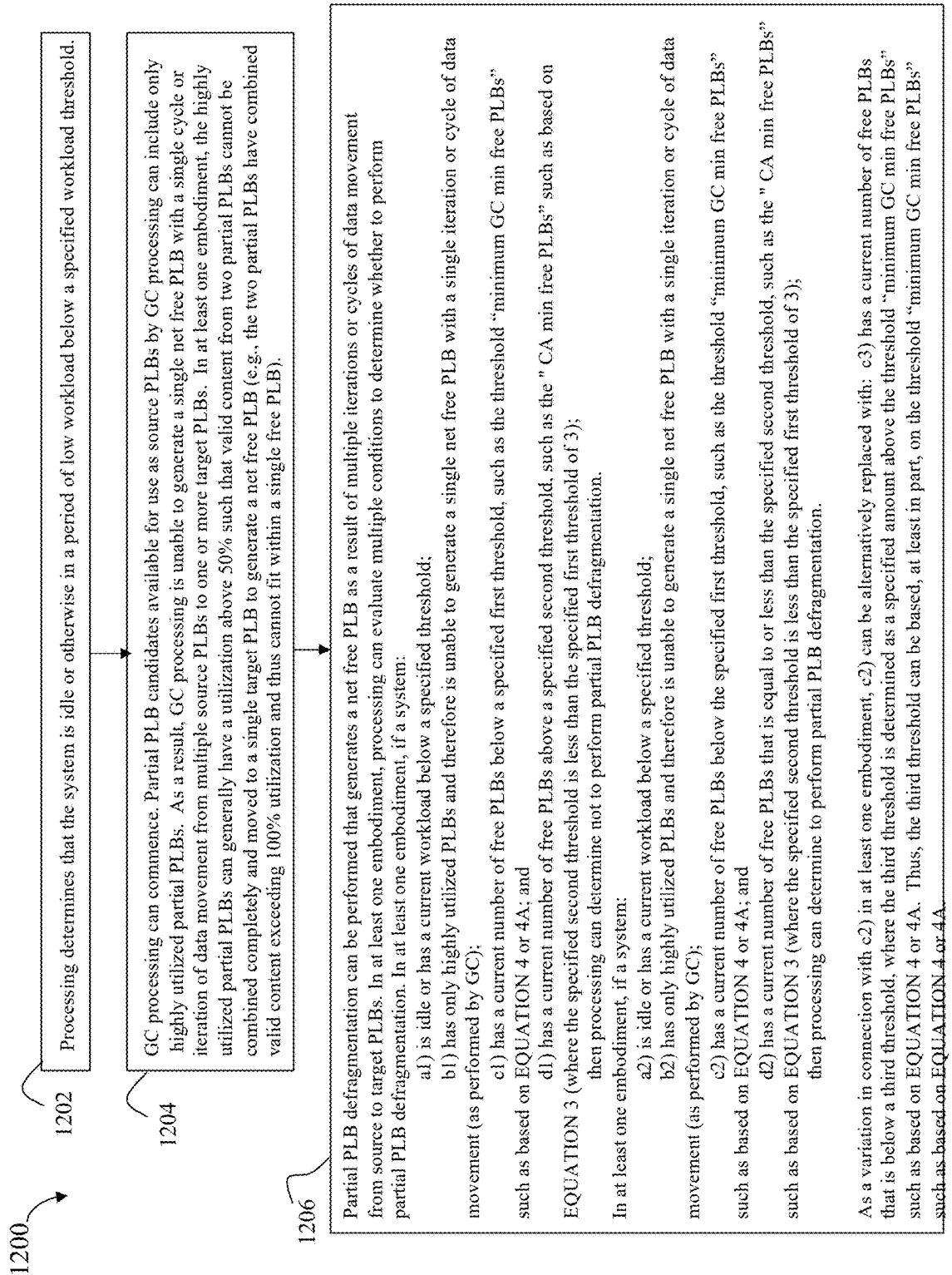

Referring to FIG. 13, shown is a flowchart 1200 of processing steps that can be performed in at least one embodiment in accordance with the techniques of the present disclosure. FIG. 13 summarizes processing discussed above.

At the step 1202, processing determines that the system is idle or otherwise in a period of low workload below a specified workload threshold. From the step 1202, control proceeds to the step 1204.

At the step 1204, GC processing can commence. Partial PLB candidates available for use as source PLBs by GC processing can include only highly utilized partial PLBs. As a result, GC processing is unable to generate a single net free PLB with a single cycle or iteration of data movement from multiple source PLBs to one or more target PLBs. In at least one embodiment, the highly utilized partial PLBs can generally have a utilization above 50% such that valid content from two partial PLBs cannot be combined completely and moved to a single target PLB to generate a net free PLB (e.g., the two partial PLBs have combined valid content exceeding 100% utilization and thus cannot fit within a single free PLB). From the step 1204, control proceeds to the step 1206.

At the step 1206, partial PLB defragmentation can be performed that generates a net free PLB as a result of multiple iterations or cycles of data movement from source to target PLBs. In at least one embodiment, processing can evaluate multiple conditions to determine whether to perform partial PLB defragmentation. In at least one embodiment, if a system:
  a1) is idle or has a current workload below a specified threshold;
  b1) has only highly utilized PLBs and therefore is unable to generate a single net free PLB with a single iteration or cycle of data movement (as performed by GC);
  c1) has a current number of free PLBs below a specified first threshold, such as the threshold "minimum GC min free PLBs" such as based on EQUATION 4 or 4A; and
  d1) has a current number of free PLBs above a specified second threshold, such as the "CA min free PLBs" such as based on EQUATION 3 (where the specified second threshold is less than the specified first threshold of 3);
then processing can determine not to perform partial PLB defragmentation.

In at least one embodiment, if a system:
  a2) is idle or has a current workload below a specified threshold;
  b2) has only highly utilized PLBs and therefore is unable to generate a single net free PLB with a single iteration or cycle of data movement (as performed by GC);
  c2) has a current number of free PLBs below the specified first threshold, such as the threshold "minimum GC min free PLBs" such as based on EQUATION 4 or 4A; and
  d2) has a current number of free PLBs that is equal to or less than the specified second threshold, such as the "CA min free PLBs" such as based on EQUATION 3 (where the specified second threshold is less than the specified first threshold of 3);
then processing can determine to perform partial PLB defragmentation.

As a variation in connection with c2) in at least one embodiment, c2) can be alternatively replaced with: c3) has a current number of free PLBs that is below a third threshold, where the third threshold is determined as a specified amount above the threshold "minimum GC min free PLBs" such as based on EQUATION 4 or 4A. Thus, the third threshold can be based, at least in part, on the threshold "minimum GC min free PLBs" such as based on EQUATION 4 or 4A.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
  receiving, at a storage system from one or more hosts, a plurality of write operations that write first content to a plurality of target logical addresses;
  recording, at the storage system, the plurality of write operations as a plurality of entries in a log;
  flushing, from the log, the plurality of entries denoting the plurality of write operations, wherein said flushing includes persistently storing, on non-volatile storage, the first content written by the plurality of write operations, wherein the non-volatile storage includes a plurality of storage devices;
  determining that the storage system has a current workload below a specified workload threshold; and
  responsive to determining that the storage system has the current workload below the specified workload threshold, performing first processing including:
    determining a first minimum number of free blocks of the non-volatile storage based on: i) a first quantity denoting an average number of free blocks expected to be consumed, within a time duration of a single time interval, in connection with flushing the log, ii) a first constant, and iii) a second minimum number of blocks denoting an upper bound of a number of blocks of the non-volatile storage consumed by flushing the log in a single time interval; and
    responsive to determining that a current number of free blocks of the non-volatile storage, that is available for storing content written by write operations having corresponding entries flushed from the log, is less than the first minimum number, performing garbage collection processing to increase the current number of free blocks of the non-volatile storage available for storing content written by write operations having corresponding entries flushed from the log.

2. The computer-implemented method of claim 1, wherein the first constant is a value that is multiplied by the first quantity to account for variations in free blocks consumed in connection with flushing the log.

3. The computer-implemented method of claim 2, wherein a first product is determined by multiplying the first constant by the first quantity, and wherein the first minimum number is determined by adding the first product and the second minimum number of blocks.

4. The computer-implemented method of claim 1, wherein the second minimum number of blocks is based, at least in part, on a maximum number of blocks consumed by a maximum number of parallel flushes of the log supported by the storage system within each single time interval.

5. The computer-implemented method of claim 4, wherein the maximum number of parallel flushes of the log supported by the storage system is based, at least in part, on a number of processor cores of the storage system available for flushing entries from the log.

6. The computer-implemented method of claim 1, wherein the average number of free blocks expected to be consumed, within a time duration of a single time interval, in connection with flushing the log, is based, at least in part, on an average flush rate denoting an average number of entries flushed from the log in each single time interval.

7. The computer-implemented method of claim 1, where the plurality of storage devices of the non-volatile storage includes non-volatile solid state drives (SSDs), and wherein the non-volatile SSDs include one or more types of flash drives.

8. The computer-implemented method of claim 1, wherein the plurality of writes includes: i) a first write that writes first data to a first logical address; and ii) a second write that overwrites the first data of the first logical address by writing second data to the first logical address, wherein the method includes:
    flushing, from the log at a first point in time, a first entry representing the first write, wherein said flushing the first entry includes storing the first data at a first storage location on the non-volatile storage; and
    flushing, from the log at a second point in time after the first point in time, a second entry representing the second write, wherein said flushing the second entry includes storing the second data at a second storage location on the non-volatile storage, wherein the second storage location is different from the first storage location, and wherein responsive to said storing the second data, the first storage location is marked as storing invalid content and available for reclamation and reuse.

9. The computer-implemented method of claim 1, wherein said performing garbage collection processing includes:
    determining, in accordance with a median block utilization, a first candidate set of partially filled blocks of the non-volatile storage;
    selecting, from the first candidate set, a first plurality of partially filled blocks to use as first source blocks;
    selecting, from the non-volatile storage, one or more target blocks of free storage; and
    copying first valid content from the first source blocks to the one or more target blocks, wherein as a result of said copying, at least one net free block of non-volatile storage is generated with respect to the first source blocks and the one or more target blocks.

10. The computer-implemented method of claim 9, wherein each partially filled block of the first candidate set has a corresponding block utilization that is equal to or less than the median block utilization, wherein the corresponding block utilization denotes a portion of said each partially filled block that stores valid content, wherein the corresponding block utilization indicates that said each partially filled block is partially filled with valid content intermixed with unused storage areas.

11. The computer-implemented method of claim 10, wherein the median block utilization is determined with respect to a population of partially filled blocks of the non-volatile storage, wherein each partially filled block of the population i) is available for storing content associated with entries flushed from the log, and ii) has an associated block utilization indicating that said each partially filled block is partially filled with valid content intermixed with unused storage areas.

12. The computer-implemented method of claim 9, further comprising:
    ordering the first candidate set of partially filled blocks of the non-volatile storage based on increasing corresponding block utilizations of the partially filled blocks of the first set; and
    wherein said selecting, from the first set, the first plurality of partially filled blocks to use as first source blocks, includes selecting two or more partially filled blocks of the first set, wherein each of the two or more partially filled blocks selected has a corresponding block utilization that is lower than any other partially filled block of the first set that is not included in the two or more partially filled blocks selected.

13. The computer-implemented method of claim 12, wherein the one or more target blocks includes a single target block, and wherein said copying the first valid content from the first source blocks includes:
    copying valid content from each of the two or more partially filled blocks to the single target block, wherein the combined utilization of the two or more partially filled blocks does not exceed 100% denoting complete utilization of the single target block.

14. The computer-implemented method of claim 1, wherein said first processing includes:
    determining, in accordance with a plurality of conditions, whether to perform partial block defragmentation that generates a single net free block of the non-volatile storage as a result of performing multiple cycles or iterations of data movement of valid content from multiple source blocks of non-volatile storage to one or more free target blocks of non-volatile storage.

15. The computer-implemented method of claim 14, wherein the partial block defragmentation is performed responsive to each of the plurality of conditions evaluating to true.

16. The computer-implemented method of claim 15, wherein the plurality of conditions includes:
    a first condition specifying that the current workload of the storage system be less than the specified workload threshold; and
    a second condition specifying that the garbage collection processing is unable to generate at least one net free block of the non-volatile storage in a single cycle or iteration of data movement of valid content from multiple source blocks of the non-volatile storage to one or more free target blocks of the non-volatile storage.

17. The computer-implemented method of claim 16, wherein the plurality of conditions includes:
- a third condition specifying that the current number of free blocks of the non-volatile storage, that is available for storing content written by write operations having corresponding entries flushed from the log, is less than the first minimum number; and
- a fourth condition specifying that the current number of free blocks of the non-volatile storage, that is available for storing content written by write operations having corresponding entries flushed from the log, is equal to or less than the second minimum number of blocks denoting an upper bound of a number of blocks of the non-volatile storage consumed by flushing the log in a single time interval.

18. A system comprising:
one or more processors; and
a memory comprising code stored thereon that, when executed, performs a method comprising:
- receiving, at a storage system from one or more hosts, a plurality of write operations that write first content to a plurality of target logical addresses;
- recording, at the storage system, the plurality of write operations as a plurality of entries in a log;
- flushing, from the log, the plurality of entries denoting the plurality of write operations, wherein said flushing includes persistently storing, on non-volatile storage, the first content written by the plurality of write operations, wherein the non-volatile storage includes a plurality of storage devices;
- determining that the storage system has a current workload below a specified workload threshold; and
- responsive to determining that the storage system has the current workload below the specified workload threshold, performing first processing including:
  - determining a first minimum number of free blocks of the non-volatile storage based on: i) a first quantity denoting an average number of free blocks expected to be consumed, within a time duration of a single time interval, in connection with flushing the log, ii) a first constant, and iii) a second minimum number of blocks denoting an upper bound of a number of blocks of the non-volatile storage consumed by said flushing the log in a single time interval; and
  - responsive to determining that a current number of free blocks of the non-volatile storage, that is available for storing content written by write operations having corresponding entries flushed from the log, is less than the first minimum number, performing garbage collection processing to increase the current number of free blocks of the non-volatile storage available for storing content written by write operations having corresponding entries flushed from the log.

19. A non-transitory computer readable medium comprising code stored thereon that, when executed, performs a method comprising:
- receiving, at a storage system from one or more hosts, a plurality of write operations that write first content to a plurality of target logical addresses;
- recording, at the storage system, the plurality of write operations as a plurality of entries in a log;
- flushing, from the log, the plurality of entries denoting the plurality of write operations, wherein said flushing includes persistently storing, on non-volatile storage, the first content written by the plurality of write operations, wherein the non-volatile storage includes a plurality of storage devices;
- determining that the storage system has a current workload below a specified workload threshold; and
- responsive to determining that the storage system has the current workload below the specified workload threshold, performing first processing including:
  - determining a first minimum number of free blocks of the non-volatile storage based on: i) a first quantity denoting an average number of free blocks expected to be consumed, within a time duration of a single time interval, in connection with flushing the log, ii) a first constant, and iii) a second minimum number of blocks denoting an upper bound of a number of blocks of the non-volatile storage consumed by said flushing the log in a single time interval; and
  - responsive to determining that a current number of free blocks of the non-volatile storage, that is available for storing content written by write operations having corresponding entries flushed from the log, is less than the first minimum number, performing garbage collection processing to increase the current number of free blocks of the non-volatile storage available for storing content written by write operations having corresponding entries flushed from the log.

* * * * *